US011029045B2

(12) United States Patent
Woods et al.

(10) Patent No.: US 11,029,045 B2
(45) Date of Patent: Jun. 8, 2021

(54) HEAT-PUMP DRIVEN DESICCANT REGENERATION

(71) Applicant: Alliance for Sustainable Energy, LLC, Golden, CO (US)

(72) Inventors: Jason David Woods, Boulder, CO (US); Eric Kozubal, Superior, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 349 days.

(21) Appl. No.: 16/353,335

(22) Filed: Mar. 14, 2019

(65) Prior Publication Data

US 2019/0285290 A1    Sep. 19, 2019

Related U.S. Application Data

(60) Provisional application No. 62/643,837, filed on Mar. 16, 2018.

(51) Int. Cl.
| | | |
|---|---|---|
| *F24F 3/14* | (2006.01) | |
| *B01D 53/18* | (2006.01) | |
| *B01D 53/26* | (2006.01) | |

(52) U.S. Cl.
CPC ............ *F24F 3/1417* (2013.01); *B01D 53/18* (2013.01); *B01D 53/263* (2013.01); *F24F 2003/1458* (2013.01); *F24F 2203/021* (2013.01)

(58) Field of Classification Search
CPC ............. F24F 3/1417; F24F 2003/1458; F24F 2203/021; B01D 53/18; B01D 53/263
See application file for complete search history.

(56) References Cited

U.S. PATENT DOCUMENTS

| | | | | |
|---|---|---|---|---|
| 4,930,322 A | * | 6/1990 | Ashley | ............... F24F 1/022 62/271 |
| 4,941,324 A | * | 7/1990 | Peterson | ............... F24F 3/1411 62/271 |
| 9,140,460 B2 | | 9/2015 | Woods et al. | |
| 9,140,471 B2 | | 9/2015 | Kozubal et al. | |
| 2015/0184876 A1 | * | 7/2015 | Vandermeulen | .... F28D 21/0015 62/271 |
| 2017/0370598 A1 | * | 12/2017 | Hamlin | ............... F24F 11/30 |

OTHER PUBLICATIONS

"What the duck curve tells us about mananging a green grid", California ISO—Fast Facts, California Independent System Operator, 2016, pp. 1-4, availabe at https://www.caiso.com/Documents/FlexibleResourcesHelpRenewables_FastFacts.pdf, accessed Mar. 7, 2019.
Kessling et al., "Energy Storage for Desiccant Cooling Systems Component Development", Solar Energy, 1998, vol. 64, Nos. 4-6, pp. 209-221.
Kozubal et al., "Development and Analysis of Desiccant Enhanced Evaporative Air Conditioner Prototype", NREL Technical Report NREL/TP-5500-54755, Apr. 2012, pp. 1-78.

(Continued)

*Primary Examiner* — Frantz F Jules
*Assistant Examiner* — Lionel Nouketcha
(74) *Attorney, Agent, or Firm* — Alexandra M. Hall

(57) ABSTRACT

Disclosed herein are systems and processes to thermally regenerate and re-concentrate a liquid desiccant (absorbent) with an electrically driven heat pump. The regeneration and re-concentration may be performed in a cost and energy efficient manner.

17 Claims, 20 Drawing Sheets

(56) References Cited

OTHER PUBLICATIONS

Kozubal, "Seminar 14—Desiccant Enhanced Air Conditioning. Desiccant Enhanced Evaporative Air Conditioning", 2013 Winter Conference, pp. 1-28.
Trabish, "Ice, ice energy: The hot market for cooled liquid energy storage", Utility Dive, Nov. 3, 2016, pp. 1-11, available at https://www.utilitydive.com/news/ice-ice-energy-the-hot-market-for-cooled-liquid-energy-storage/408356/, accessed Mar. 7, 2019.
Ware III, "A Low-Cost-Solar Liquid Desiccant System for Residential Cooling", A Thesis submitted to The Florida Statue University—FAMU-FSU College of Engineering, 2013, pp. 1-74.
Woods et al., "A desiccant-enhanced evaporative air conditioner: Numerical Model and experiments", Energy Conversion and Management, 2013, vol. 65, pp. 208-220.

* cited by examiner

HEAT-PUMP DRIVEN DESICCANT REGENERATION

CROSS-REFERENCE TO RELATED APPLICATIONS

The application claims the benefit of U.S. Provisional Application No. 62/643,837 filed Mar. 16, 2018, the contents of which are incorporated herein by reference in their entirety.

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

According to the Air Conditioning, Heating, and Refrigeration Institute, air conditioning consumes 15% of the United States' annual electricity generation and up to 50% of the peak electric power generation. It is also the main driver in increased power generation worldwide, with sales increasing 6% annually. Improving air conditioning technology is imperative to reducing carbon pollution.

Heat pumps may be used as a part of a system to provide heating and air conditioning. However, they require large amounts of energy. Improving the efficiency of the air conditioning and heating processes of heat pumps benefits not only the end consumer, but also society, writ large.

The foregoing examples of the related art and limitations related therewith are intended to be illustrative and not exclusive. Other limitations of the related art will become apparent to those of skill in the art upon a reading of the specification and a study of the drawings.

SUMMARY

In one aspect, a method comprising removing a moisture from a first air stream using a desiccant to absorb the moisture, operating a heat pump comprising a refrigerant stream circulating through an evaporator, a compressor, a valve, and a condenser, routing the desiccant that is diluted with the moisture through the condenser to heat the desiccant and evaporate the moisture, collecting the evaporated moisture using a second air stream also routed through the condenser, and depositing the evaporated moisture in the evaporator by routing the second air stream through the evaporator. In some embodiments, the method may further comprise cooling the first air stream using evaporative cooling. In some embodiments, the evaporated moisture collected in the evaporator may be used to provide the evaporative cooling.

In some embodiments, the second air stream may be routed through an air-to-refrigerant heat exchanger prior to entering the condenser, and the refrigerant may be routed through the air-to-refrigerant heat exchanger after exiting the condenser. In some embodiments, the second air stream may be routed through an air-to-air heat exchanger after exiting the condenser but prior to entering the evaporator. In some embodiments, the second air stream may be routed through the air-to-air heat exchanger prior to entering the condenser, in some embodiments, the second air stream is routed through the air-to-air heat exchanger after exiting the evaporator.

In some embodiments, the method may further comprise splitting the refrigerant stream exiting the compressor into a first refrigerant stream and a second refrigerant stream using a three-way valve, routing the first refrigerant stream through the condenser, routing the second refrigerant stream and the first air stream through a first air-to-refrigerant heat exchanger, combining the first refrigerant stream and the second refrigerant stream into a unified refrigerant stream, routing the unified refrigerant stream through a second air-to-refrigerant heat exchanger, and routing the second air stream through the second air-to-refrigerant heat exchanger prior to entering the condenser. In some embodiments, the first air stream may be heated by the first air-to-refrigerant heat exchanger.

In some embodiments, the refrigerant stream may bypass the condenser, the refrigerant stream may be used to heat a secondary fluid in a refrigerant-to-secondary fluid heat exchanger, and the secondary fluid may be routed through the condenser. In some embodiments, the secondary fluid is water. In some embodiments, the refrigerant is routed through an air-to-refrigerant heat exchanger after exiting the refrigerant-to-secondary fluid heat exchanger, and the second air stream passes through the air-to-refrigerant heat exchanger prior to entering the condenser.

In some embodiments, the operation of the heat pump occurs when a majority of the desiccant is diluted with the moisture. In some embodiments, the method further comprises storing the desiccant and the moisture in a tank. In some embodiments, the tank contains a device configured to measure the volume of the desiccant and the moisture in the tank. In some embodiments, the heat pump is operated when the volume of the desiccant and the moisture in the tank reaches a pre-determined level. In some embodiments, the heat pump is operated until a majority of the desiccant is not diluted with the moisture.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
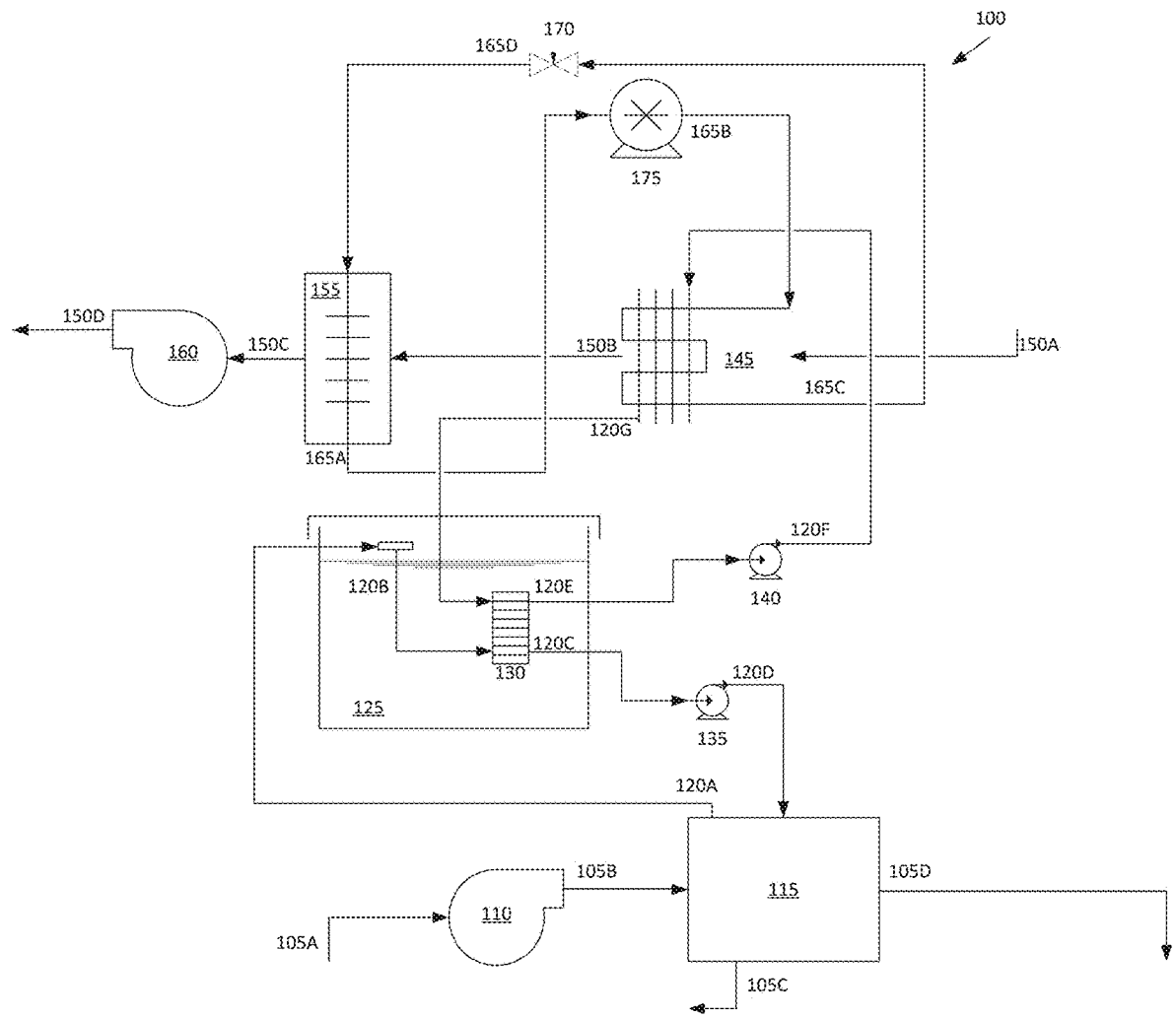
FIG. 1 illustrates a heat-pump driven liquid desiccant regeneration system and process as described in some aspects of the present disclosure.

Disclosed herein are systems and processes to thermally regenerate and re-concentrate a liquid desiccant with an electrically driven heat pump. In some embodiments, the processes described herein may be used as a part of the operation of an electrically driven desiccant regeneration integration with enhanced liquid desiccant air conditioning. An embodiment of the present disclosure differs from traditional heat-driven methods of liquid desiccant regeneration that use direct combustion or waste heat. As used herein, regenerate may mean to convert a desiccant from weak to strong (i.e., from diluted to concentrated).

A desiccant may be a fluid capable of absorbing water or moisture. It may also be referred to as an absorbent or a liquid desiccant if dissolved in water or another liquid. It may be salt such as potassium acetate, lithium chloride, calcium chloride, lithium bromide, or a glycol. A liquid desiccant has a lower vapor pressure than water at a given temperature, allowing air that moves through the liquid desiccant (a lower pressure solution than water) to be dehumidified. The vapor pressure of a liquid desiccant is typically proportional with heat levels, but inversely proportional with concentration levels. A concentrated or strong desiccant is able to absorb moisture from an airstream. A diluted or weak desiccant is unable (or may be less able) to absorb moisture from an airstream. Water may evaporate from the liquid desiccant when the liquid desiccant is heated and the liquid desiccant's vapor pressure is increased, changing the liquid desiccant from weak to strong.

In an aspect, disclosed is a method of removing water from a liquid desiccant, wherein the thermal source for the water evaporation from the liquid desiccant is generated by a heat pump. The heat pump may be operated using power from electricity. In some embodiments, the heat pump may be operated when the majority of the desiccant is weak. In some embodiments, the heat pump may be operated when electricity costs are low (i.e., when electricity demand is low). The use of the heat pump as needed to recharge the desiccant or when electricity costs are low makes the present disclosure capable of significant energy efficiency and cost savings. As used herein, a heat pump may be a system that may circulate a refrigerant stream (or other heat transfer fluid) through a valve, an evaporator, a condenser, and a compressor. The valve may be a throttling valve. In some embodiments, the hot-side of the heat pump may be used to regenerate a liquid desiccant solution. In some embodiments, the refrigerant or heat transfer fluid may be R410A, R1234yf R134a, propane, water, or other fluids.

In some embodiments, the water evaporation from the liquid desiccant may occur in a liquid desiccant regenerator which accepts a stream of diluted desiccant, a stream of a refrigerant, and a stream of outdoor air. The liquid desiccant regenerator maybe the condenser of a heat pump. The outdoor air stream may scavenge the evaporated water vapor from the liquid desiccant regenerator and provide a thermal source for the heat pump after leaving the liquid desiccant regenerator (i.e., the outdoor air stream may provide heat from the regenerator to the evaporator). The refrigerant stream may provide the heat needed to make the water evaporate from the liquid desiccant in the regenerator. In some embodiments, the heat pump may be a vapor compression heat pump, and the thermal heat to the liquid desiccant regenerator may be the high-pressure refrigerant gas exiting the compressor of the heat pump, and the source heat exchanger may be a direct expansion air-to-refrigerant evaporator. The liquid desiccant regenerator may be substantially similar to the condenser of a vapor compression heat pump. The liquid desiccant regenerator may be a three fluid heat exchanger wherein heat is exchanged between the liquid desiccant, the air stream, and the refrigerant stream. In some embodiments, the liquid desiccant regenerator may be a wicking fin heat exchanger, wherein heat is exchanged between a refrigerant stream, an outdoor air stream, and the liquid desiccant. As used herein, a regenerator may refer to a condenser in a traditional heat pump and a device which "regenerates" the desiccant by removing moisture and re-concentrating the desiccant.

The strong desiccant may absorb moisture in a conditioner. In some embodiments, the liquid desiccant may be stored in a tank in between the conditioner and the regenerator. The moisture absorbed by the desiccant from the process air stream may be stored in the tank as well. The weak desiccant may be drawn from the tank, routed through the regenerator where it is heated and regenerated, and returned to the desiccant tank. The tank may hold both weak liquid desiccant and strong liquid desiccant. The weak liquid desiccant and strong liquid desiccant may be separated by means of density stratification. Strong desiccant is more dense than weak desiccant, and water diffusion rates through desiccant are sufficiently slow such that the concentrated desiccant collects at the bottom of the tank, and the diluted desiccant rises to the top of the tank. The tank may be a hollow container having a substantially circular, triangular, or rectangular cross section. The tank may be made of a solid material such as plastic, fiberglass, steel, aluminum, or a mixture of materials. The tank need not be insulated or contain a heating device. In some embodiments, the tank may have an integral interchange heat exchanger (ICHX). The ICHX may be placed internal to the tank such that leaks originating from fluid fittings in the ICHX may be captured within the tank. The ICHX may be a plate and frame, shell and tube, or tube-in-tube heat exchanger. The tank may also contain a float where a diluted desiccant tube opening resides and skims the weakest desiccant from the fluid surface. In some embodiments, the tank may have sensors capable of measuring the volume of liquid desiccant contained in the tank, and the heat pump may be activated when the volume reaches a certain level, indicating the majority of the liquid desiccant is weak. The organization of the desiccant within the tank may be based on stratification, wherein the strong desiccant is denser than the weak desiccant, and therefore the strong desiccant may be lower in the tank than the weak desiccant.

In some embodiments, the liquid desiccant may be used in conjunction with evaporative cooling to cool air. This may occur in a liquid desiccant conditioner. The liquid desiccant may absorb moisture from the air and the evaporative cooling may reduce the temperature of the air. The air to be cooled may be a process air stream or an indoor air stream. The combination of liquid desiccant and evaporative cooling may be described in U.S. Pat. No. 9,140,471 B2 and/or U.S. Pat. No. 9,140,460 B2. Removing the moisture from the air (and thereby absorbing the moisture) makes the liquid desiccant become diluted. The use of the liquid desiccant in combination with evaporative cooling enables evaporative cooling to be performed even in high humidity conditions or air conditions in which evaporative cooling is traditionally not operable.

In some embodiments, the water used as coolant in the evaporative cooling process may be routed through the evaporator of the heat pump. The air stream from the liquid desiccant regenerator may bring water vapor and heat to the evaporator, which then may cool the process water. This may also recycle the water absorbed by the desiccant from the air to be cooled. This may reduce the amount of water needed by the evaporative cooling process. In some embodiments, the condensed water from the evaporator may be re-used in an evaporatively cooled conditioner. The moisture removed from the airstream by the desiccant may be collected in the evaporator and may be used to evaporatively cool the process air stream.

In some embodiments, the electric heat pump regeneration process described herein enables energy storage in the concentrated liquid desiccant, which may be stored in an unpressurized tank. Electricity may be used to operate the heat pump and regenerate the liquid desiccant during a part of the day when electricity prices are low. The system may continue to dehumidify and cool the air throughout the day and store the diluted desiccant when electricity prices are higher. This may enable energy storage for the electric grid, which may provide bulk energy storage from low-electricity price times to high-electricity price times. For example, the present disclosure may be utilized in conjunction with electricity generation from photovoltaic panels, which often peaks in efficiency (and thus low-electricity price times) just before the peak demand for building air conditioning. In some embodiments, the regeneration process (i.e., the activation of the heat pump to regenerate the liquid desiccant) may be controlled based on a price signal, and the cooling of the indoor air may be controlled with the building thermostat.

As used herein, the terms "routed," "enter," "through," and other descriptions of the flow of the air streams, refrigerant, secondary fluid, or desiccant may mean the air streams, refrigerant, secondary fluid, or desiccant was sent to the device mentioned, possibly by means of a pipe.

In some embodiments, an input that indicates the state of charge of the tank may be utilized. The state of charge may be the percent concentration of the liquid desiccant contained in the tank, or another indication of how much moisture the liquid desiccant has the potential to absorb from the indoor air to be cooled. In some embodiments, the heat pump may be activated with the state of charge of the tank reaches a point where the liquid desiccant would not be able to remove moisture from the air (i.e., it is diluted), and therefore the evaporative cooling system would not be able to cool the indoor air. In some embodiments, a high-pressure refrigerant gas may be used to heat a recirculating secondary fluid, wherein the secondary fluid stream may be circulated through the liquid desiccant regenerator. The refrigerant stream exiting the liquid-refrigerant heat exchanger may be diverted through a refrigerant-to-air heat exchanger to pre-heat the air entering the liquid desiccant regenerator.

In some embodiments, the liquid desiccant regenerator may be a heat and mass exchanger that accepts hot refrigerant, desiccant, and air. Such a liquid desiccant regenerator may be known as a wicking fin regenerator or a wicking fin heat and mass exchanger. This type of regenerator can be more efficient than a liquid desiccant regenerator that accepts hot liquid, because the high-pressure refrigerant gas from a compressor can be at a temperature significantly higher than that of a liquid. Capturing heat at this higher temperature leads to a higher mean temperature for regeneration, and thus higher efficiency. In some embodiments the liquid desiccant regenerator may be what is often known as the condenser in the heat pump.

In some embodiments, the liquid desiccant conditioner may be a device that uses liquid desiccant to condition a process air stream. This may be a conditioner that also receives a cooling stream from a chilled water source such as that form a chiller or a cooling tower. It may also have integral cooling such as air or evaporative cooling. In the case of integral evaporative cooling, water collected from the regeneration process can be re-used as the input to the evaporatively cooled conditioner.

FIG. 1 illustrates a diagram of heat-pump driven liquid desiccant regeneration system and process as described in some aspects of the present disclosure. The heat-pump driven liquid desiccant regeneration system 100 is designed to cool indoor air 105. Indoor air stream 105A first enters a process fan 110 then is sent via indoor air stream 105B to the liquid desiccant conditioner 115. The indoor air stream 105B is split in the liquid desiccant conditioner 115 into an exhaust air stream 105C, which is released externally, and a return indoor air stream 105D, which is cooled air that is returned to the indoor space. A strong liquid desiccant stream 120D is pumped by a strong liquid desiccant pump 135 into the liquid desiccant conditioner 115. In the liquid desiccant conditioner 115, the liquid desiccant absorbs moisture from the indoor air stream 105B and then is returned as a weak liquid desiccant stream 120A to the liquid desiccant storage tank 125. Absorbing moisture in the liquid desiccant conditioner 115, makes the strong liquid desiccant become weak.

In the liquid desiccant storage tank 125 the weak desiccant and strong desiccant are separated by means of density stratification, whereby denser desiccant (which is strong desiccant) is lower in the tank than less-dense desiccant (which is weak desiccant). Concentrated (strong) desiccant is denser than diluted (weak desiccant), and the water diffusion rates through the liquid desiccant are sufficiently slow such that the concentrated desiccant collects at the bottom of the tank, and the diluted desiccant rises to the top of the tank. Strong desiccant stream 120B may be routed through an integral interchange heat exchanger (ICHX) 130. The ICHX 130 may be placed internal to the liquid desiccant storage tank 125 such that leaks originating from fluid fittings of the ICHX 130 may be captured within the liquid desiccant storage tank 125. The ICHX 130 may be a plate and frame heat exchanger, shell and tube heat exchanger, tube-in-tube heat exchanger, or wicking fin heat exchanger. The tank may also contain a float or a floating tube whereby the diluted desiccant tube opening resides and skims the weakest desiccant from the fluid surface to be routed through the regeneration process. The tank may also include an opening near the bottom of the tank for strong desiccant to be removed and routed through the liquid desiccant conditioner 115.

As shown in FIG. 1, in some embodiments a weak desiccant stream 120E may be removed from the tank 125 and routed through a weak desiccant pump 140 then to the liquid desiccant regenerator 145 by means of weak liquid desiccant stream 120F. In the liquid desiccant regenerator 145 the weak liquid desiccant 120F is heated, causing the moisture contained within the desiccant to evaporate and the liquid desiccant to exit the liquid desiccant regenerator 145 as a strong liquid desiccant 120G. The strong liquid desiccant stream 120G is then returned to the liquid desiccant storage tank 125.

The weak liquid desiccant stream 120F is heated in the liquid desiccant regenerator 145 using both a refrigerant stream 165B and an external air used as a heat transfer fluid stream 150A. The liquid desiccant regenerator 145 is a part of a heat pump system which includes the liquid desiccant regenerator 145 (which is acting as a condenser), an evaporator 155, a compressor 175, and a throttling valve 170. The heat pump circulates a refrigerant 165 between each component. The heat pump may be operated only when necessary to regenerate the liquid desiccant. The heat pump may be powered with electricity. Depending on the amount of liquid desiccant and the use of the liquid desiccant conditioner to cool in the indoor air 105A, the heat pump may be operated when electricity costs are low to make the system more energy efficient. The ability to control the time of use of the heat pump and to limit the amount of use of the heat pump make this process very energy efficient.

In the heat pump shown as a part of FIG. 1, a refrigerant stream 165A is routed to a compressor 175. Refrigerant stream 165A is a saturated vapor. The compressor 175 compresses the refrigerant to a higher pressure, resulting in refrigerant stream 165B being a superheated vapor. The refrigerant stream 165B is routed through the liquid desiccant regenerator 145, which cools the refrigerant (as heat flows from the refrigerant to the liquid desiccant) and condenses the refrigerant so that refrigerant stream 165C exits the regenerator 145 a saturated liquid. After exiting the liquid desiccant regenerator 145, the refrigerant stream 165C is routed through a throttling valve, where it experiences a pressure drop due to the friction of the valve. This causes refrigerant stream 165D to be a combination of liquid and vapor. Refrigerant stream 165D is then routed through an evaporator 155, where it is heated.

In FIG. 1, an outdoor air stream 150 is used as an additional heat transfer fluid or secondary fluid, making the system more energy efficient. Outdoor air stream 150A is sent through the liquid desiccant regenerator, where it absorbs some of the heat provided by the refrigerant stream 165B to the weak liquid desiccant stream 120F. The heat absorbed by the outdoor air stream 150A may be heat that would otherwise be lost to the environment. The outdoor airstream 150A may also absorb moisture that is evaporated from the weak liquid desiccant 120F in the liquid desiccant regenerator 145. The heated and humid outdoor air stream 150B is then routed to the evaporator 155, where some of the heat it is carrying may be used to make the evaporator 155 operate more efficiently. That is, the humid outdoor air stream 150B may release heat in the evaporator 155 to heat the refrigerant stream 165D. Some of the moisture in the outdoor air stream 150B may also be evaporated in the evaporator. This moisture may be collected and used to supplement the water required by the evaporative cooling system in the liquid desiccant conditioner 115. After exiting the evaporator, the outdoor air stream 150O is then routed through a process fan 160, before being released to the environment in outdoor air stream 150D.

The airstream 150A picks up heat and moisture in the liquid desiccant regenerator 145, and this heat and moisture is recaptured from the airstream by the refrigerant in the evaporator 155. This cooled and dehumidified air 150O is then exhausted to the outside after being expelled by regeneration fan 160. The regeneration fan 160 may be moved to before the liquid desiccant regenerator to capture electrical heat into the regeneration process. Recapturing the additional sensible and latent energy in this airstream on the liquid desiccant-side of the heat pump significantly improves efficiency. As a by-product, the condensed moisture, that drains from the evaporator, can be collected and re-used.

In FIG. 1, the compressor 175 pressurizes a vapor refrigerant 165A which then goes through a liquid desiccant regenerator 145, where the refrigerant condenses into a liquid 165C. The condensation energy from the refrigerant is used to heat the liquid desiccant 120F, raising its vapor pressure and causing water to evaporate from the desiccant into an airstream 150B. This regenerated desiccant 120G can be used to dehumidify indoor air 105B in the liquid desiccant conditioner 115. The refrigerant then goes through a throttling valve 170, which reduces the pressure 165D, and the refrigerant then evaporates back to the vapor phase in the evaporator 155.

Figure 2:
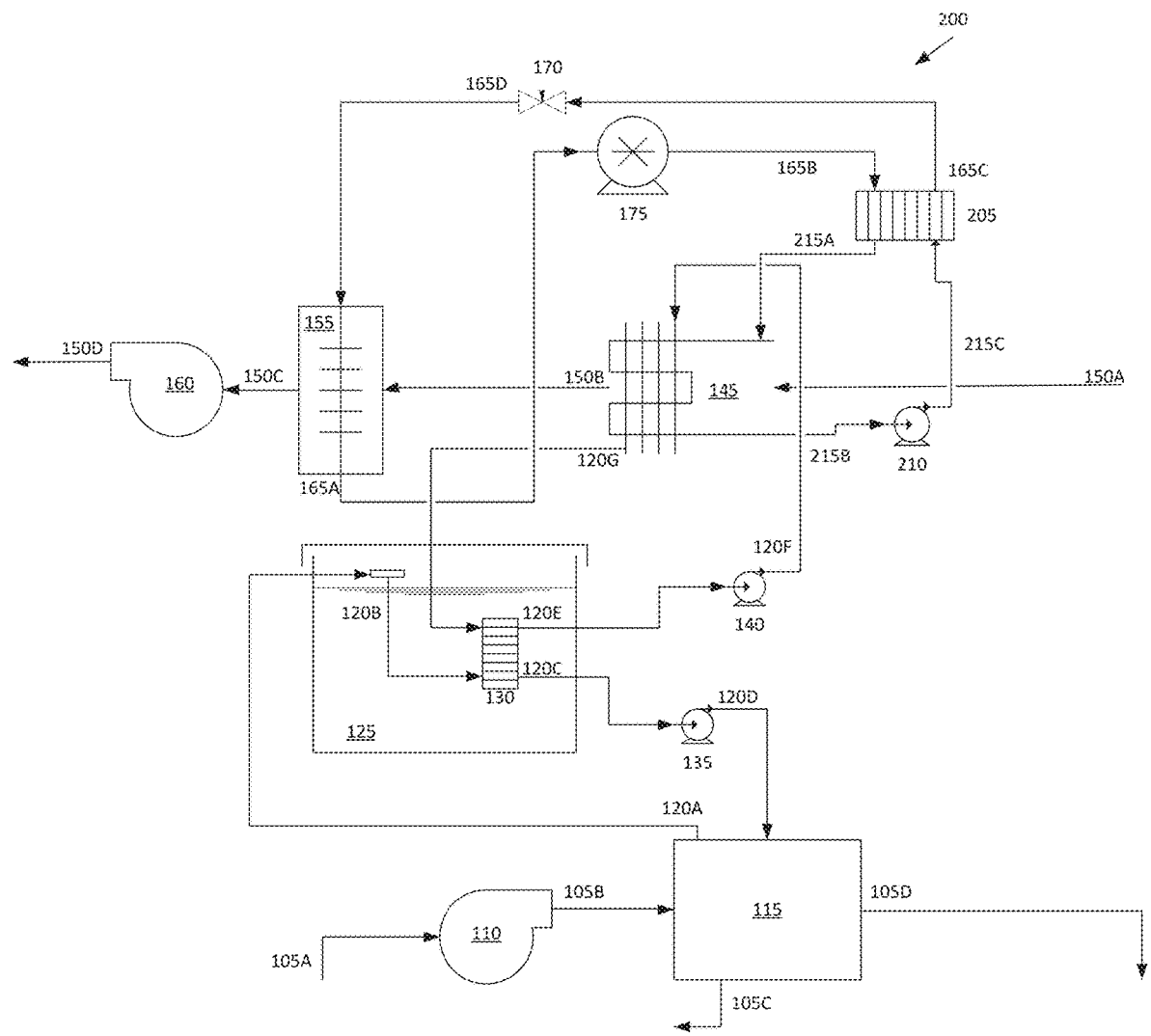
FIG. 2 illustrates a heat-pump driven liquid desiccant regeneration system and process using a water-to-refrigerant heat exchanger as described in some embodiments of the present disclosure.

FIG. 2 illustrates a heat-pump driven liquid desiccant regeneration process using a water-to-refrigerant heat exchanger as described in some embodiments of the present disclosure. For clarity, the elements in FIG. 2 that are substantially similar to that in FIG. 1 retain their same identification numbers. The regeneration system and process 200 shown in FIG. 2 includes a water-to-refrigerant heat exchanger 205 that is used before the liquid desiccant regenerator 145, enabling water/liquid desiccant/air heat and mass exchangers to be a part of the regeneration process 200. The superheated vapor refrigerant stream leaving the compressor 165B is routed through the water-to-refrigerant heat exchanger 205 then routed as a saturated liquid 165C to the throttling valve 170. In the water-to-refrigerant heat exchanger, heat is transferred from the superheated vapor refrigerant stream leaving the compressor 165B to a water stream 215A. The heated water stream 215A then is routed to the liquid desiccant regenerator 145, where it is used to heat the weak liquid desiccant 120F. When moisture evaporates from the weak liquid desiccant 120F in the liquid desiccant regenerator 145, it may be added to the water stream 215B, which may be pumped via pump 210 then returned to the water-to-refrigerant heat exchanger 205 via water stream 215C. In this embodiment, the water is acting as a secondary fluid. In some embodiments, any secondary fluid, such as another refrigerant stream, could be used.

Figure 3:
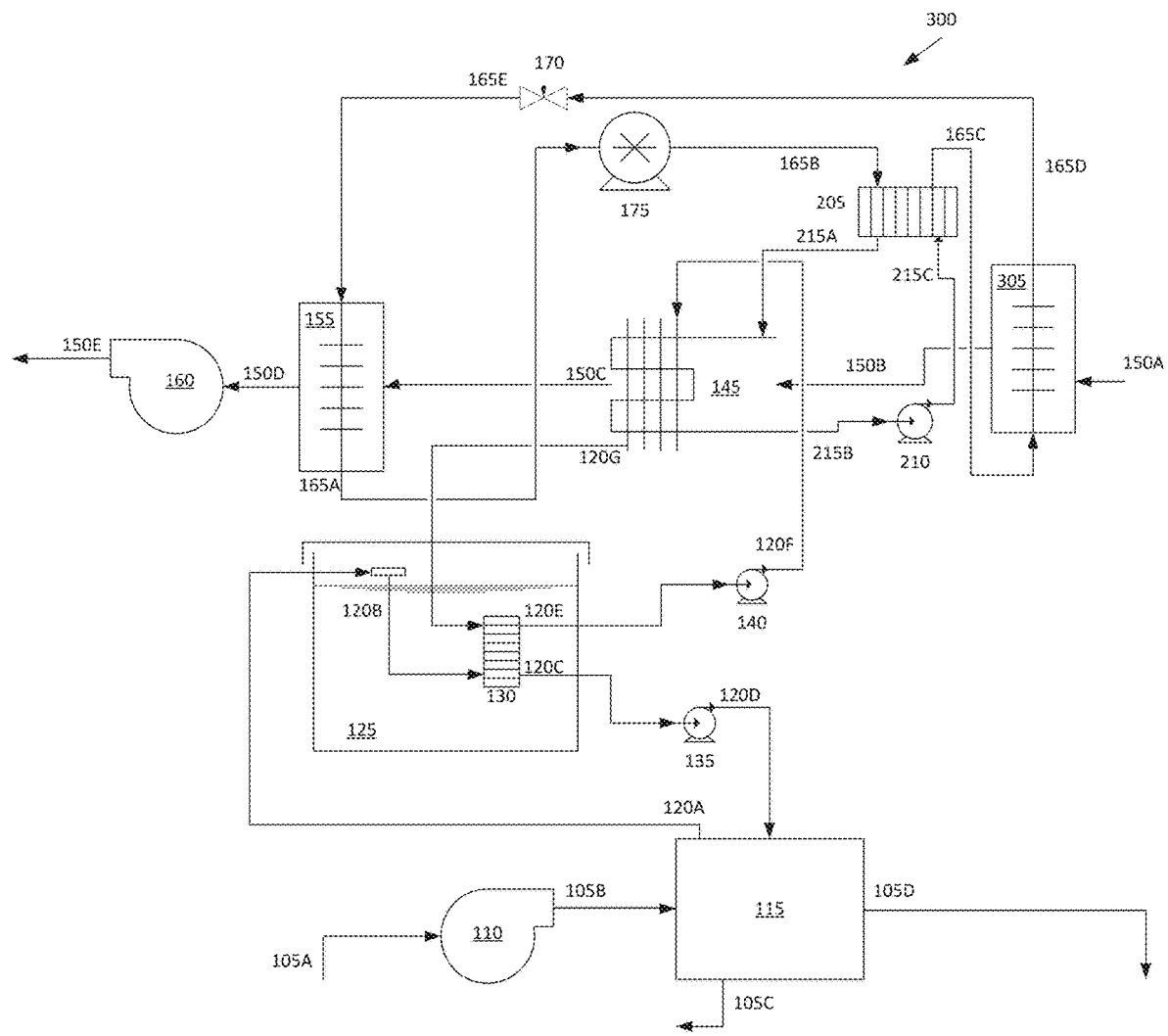
FIG. 3 illustrates a heat-pump driven liquid desiccant regeneration system and process that includes using an air preheater/refrigerant subcooler and a water-to-refrigerant heat exchanger as described in some embodiments of the present disclosure.

FIG. 3 illustrates an embodiment of the present disclosure that includes of heat-pump driven liquid desiccant regeneration processes using an air preheater/refrigerant subcooler for the outside air. For clarity, the elements in FIG. 2 that are substantially similar to that in FIG. 1 and FIG. 2 retain their same identification numbers. The regeneration process and system 300 shown in FIG. 3 shows the regeneration process and system 200 from FIG. 2 with the addition of an air pre-heater/refrigerant subcooler 305 to heat the external air to be used as a heat transfer fluid 150A. The external air is heated in the pre-heater/refrigerant subcooler 305 then routed via 150B to liquid desiccant regenerator 145. From the water-to-refrigerant heat exchanger 205, the saturated liquid refrigerant 165C is routed through the pre-heater/refrigerant subcooler 305 where it releases heat to the external air 150A. From the pre-heater/refrigerant subcooler 305 the supercooled refrigerant 165D is routed to the throttling valve 170. In this embodiment, the water is acting as a secondary fluid. In some embodiments, any secondary fluid, such as another refrigerant, could also be used.

In some embodiments, as depicted in FIG. 3, air pre-heater/refrigerant subcooler 305 may be a heat exchanger that may be added between the liquid desiccant regenerator inlet air and the exiting refrigerant liquid to improve efficiency by preheating the air stream 150A with the liquid refrigerant 165C. As no additional lift by the compressor is required for this step, more heat is added to the process without significant additional electrical input to the compressor. This may increase the efficiency of the overall regeneration process. This is illustrated by the refrigerant state exiting the preheat exchanger 165C in Table 1 and in FIG. 5, whereby the temperature approaches the inlet air temperature 165E. The enthalpy of the liquid refrigerant is minimized and thus the heat extracted from the refrigerant stream is maximized. The enthalpy difference between 165C and 165D is about 25% of that from 165B to 165D. The 25% additional heat results in higher water removal capacity.

TABLE 1

Modeled refrigerant and water states for one case for design in FIG. 3

| | Refrigerant | | | |
|---|---|---|---|---|
| State | T ° C. | h kJ/kg | P kPa | x — |
| 165E | 26.8 | 260 | 1735 | 0.096 |
| 165A | 31.8 | 434 | 1730 | |
| 165B | 86.9 | 464 | 4045 | |
| Condensing Dewpoint | 62.4 | 410 | 4045 | 1.000 |
| 165C | 58.2 | 302 | 4045 | |
| 165D | 37.6 | 260 | 4045 | |

A numerical model of the electric regenerator process as depicted in FIG. 3 was constructed. The model includes equations for calculating the performance of each component, including the compressor, evaporator, water-to-refrigerant condenser heat exchanger, air preheater/refrigerant subcooler, liquid desiccant regenerator, and the desiccant-to-desiccant interchange heat exchanger (see Table 2). Table 3 shows calculated values for modeled air, liquid desiccant (liquid desiccant) and water states for a case for design in FIG. 3.

TABLE 2

Specifications of components modeled for the design in FIG. 3

| Component | |
|---|---|
| Compressor | Variable speed compressor with performance map from Emerson (ZPV063) R410a Refrigerant |
| LIQUID DESICCANT Regenerator | Parallel plate design with desiccant-lined air channels and water channels 15 air channels per latent ton Finite-difference model with calculated heat and mass transfer coefficients Lithium Chloride (LiCl) as desiccant |
| Evaporator | NTU-effectiveness model with UA = 0.75 W/K per latent ton Pressure drop = 100 Pa |
| Subcooler | 75% constant effectiveness Pressure drop = 75 Pa |
| Interchange HX (ICHX) | 85% constant effectiveness (desiccant return T = 20° C.) Fluid flow rates |
| Air | 125 cfm per latent ton |
| Water | 10 L/min per latent ton |
| Desiccant | 1 L/min per latent ton |

TABLE 3

Calculated values for modeled air, liquid desiccant, and hot water states for the design in FIG. 3

| | Air | | Liquid Desiccant | | Hot Water |
|---|---|---|---|---|---|
| State | T ° C. | DP Pa | T ° C. | Conc kg/kg | T ° C. |
| 165E | 34 | 20 | | | 61.3 |
| 165A | 49.5 | 20 | | | 56.8 |
| 165B | 58.5 | 34.2 | 50.0 | 0.35 | 57.2 |
| 165C | 26.8 | 34.2 | 58.0 | 0.38 | |
| 165D | 27.2 | 26.7 | | | |

The model was used to predict the performance of the regeneration process. The temperature, humidity, and LiCl concentration model output for one case is shown in FIG. 5 where refrigerant states are shown in the T-s diagram in the bottom right.

Figure 4:
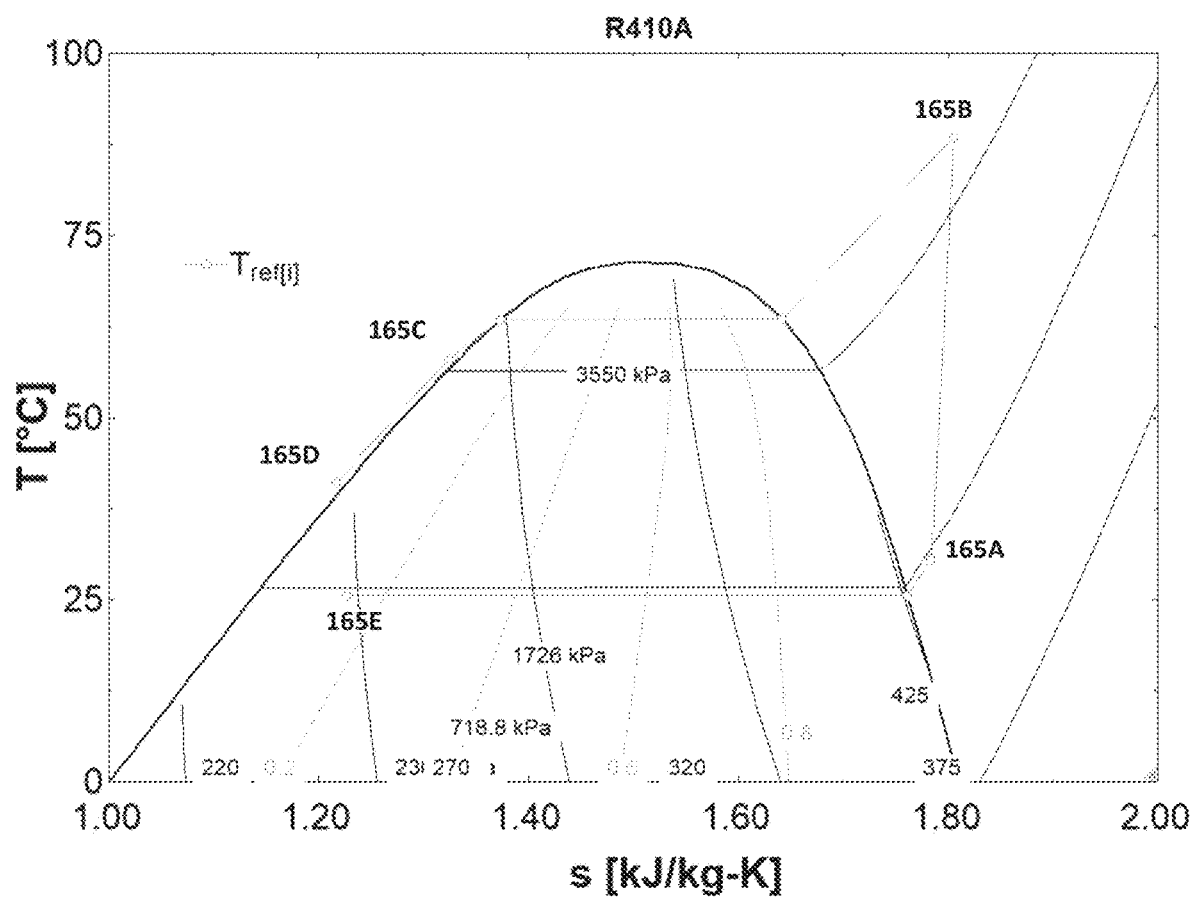
FIG. 4 depicts the refrigerant states throughout the embodiment shown in FIG. 3.

FIG. 4 depicts the refrigerant states throughout the embodiment shown in FIG. 3. For clarity, the elements in FIG. 4 that are substantially similar to that in FIG. 1, FIG. 2, or FIG. 3 retain their same identification numbers. The points on the temperature entropy graph are labeled with the corresponding stream number in FIG. 3. The point labeled 165E corresponds to the combination of liquid and vapor refrigerant stream entering the evaporator 155. The evaporator almost entirely exothermically increases the entropy of the refrigerant, until it exits the evaporator 155 as a saturated vapor in stream 165A. The saturated vapor stream 165A is then sent to the compressor 175, where it is compressed to a superheated vapor refrigerant stream 165B. The superheated vapor stream 165B is routed to the water-to-refrigerant heat exchanger 205, where it is cooled. A saturated liquid refrigerant stream 165C exits the water-to-refrigerant heat exchanger 205 and is routed to the air pre-heater/refrigerant subcooler 305, where it is supercooled. The temperature, pressure, and entropy values shown in FIG. 4 are meant for exemplary purposes only, the present disclosure could be operated with different values than those shown in FIG. 4.

Figure 5:
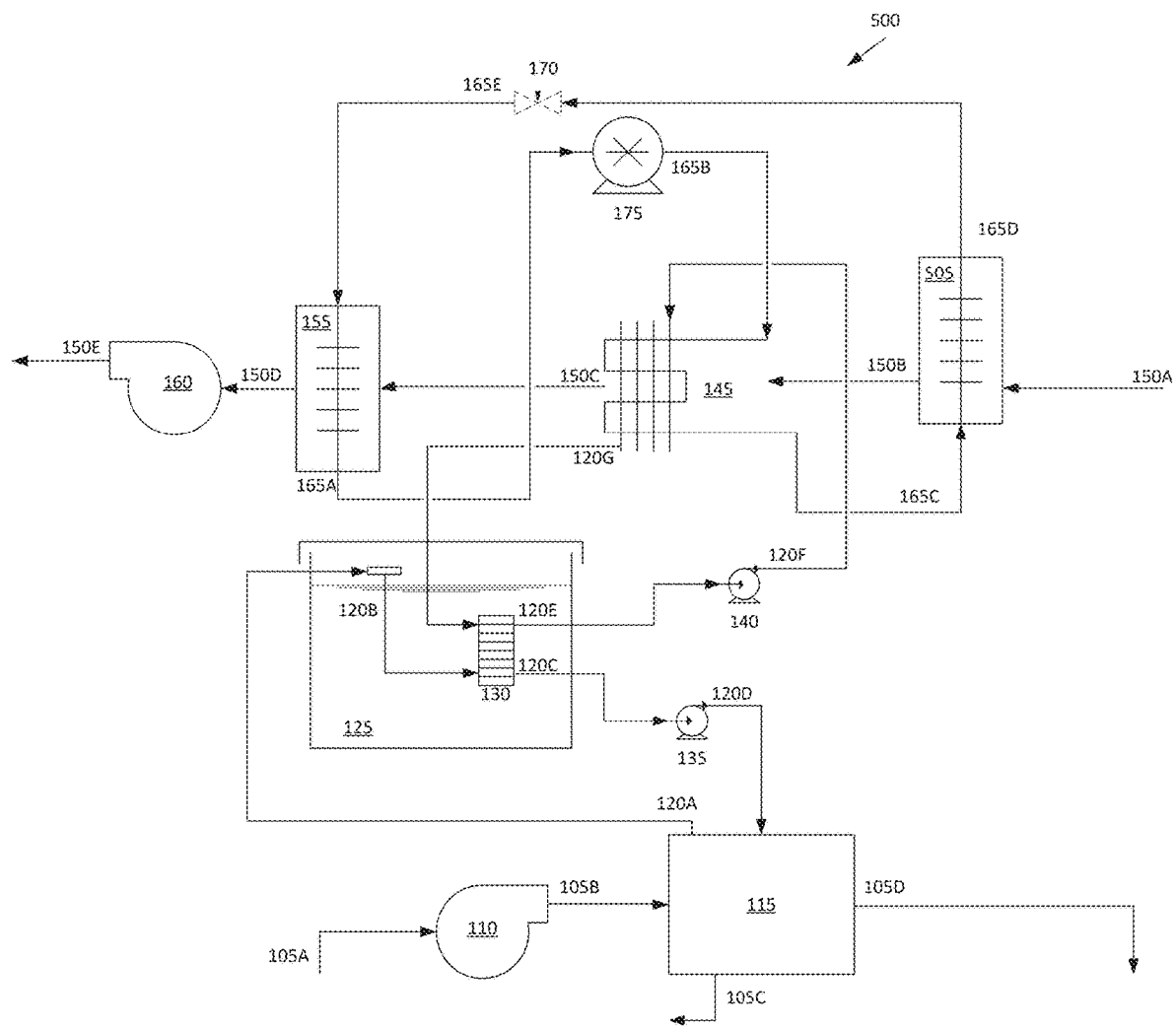
FIG. 5 illustrates a heat pump liquid desiccant regeneration system and process that includes using an air preheater/refrigerant subcooler as described in some embodiments of the present disclosure.

FIG. 5 illustrates a heat pump liquid desiccant regeneration process that includes using an air preheater/refrigerant subcooler as described in some embodiments of the present disclosure. For clarity, the elements in FIG. 5 that are substantially similar to that in FIG. 1, FIG. 2, FIG. 3, or FIG. 4 retain their same identification numbers. The liquid desiccant regeneration process and system 500 shown in FIG. 5 includes utilizing an air preheater/refrigerant subcooler for the external airstream that will be used as a heat transfer fluid 150A. After exiting the liquid desiccant regenerator 145, the saturated liquid refrigerant stream 165C is routed to an air pre-heater/refrigerant subcooler 505, where it is cooled to supercooled temperatures. The heat released by the saturated liquid refrigerant stream 165C is absorbed by the external air 150A, which then via air stream 150B is routed to the liquid desiccant regenerator 145 where the heat is used to heat the weak liquid desiccant 120F, causing the moisture in the weak liquid desiccant stream 120F to evaporate, turning the liquid desiccant into a strong liquid desiccant 120G, which is returned to the liquid desiccant storage tank.

Figure 6:
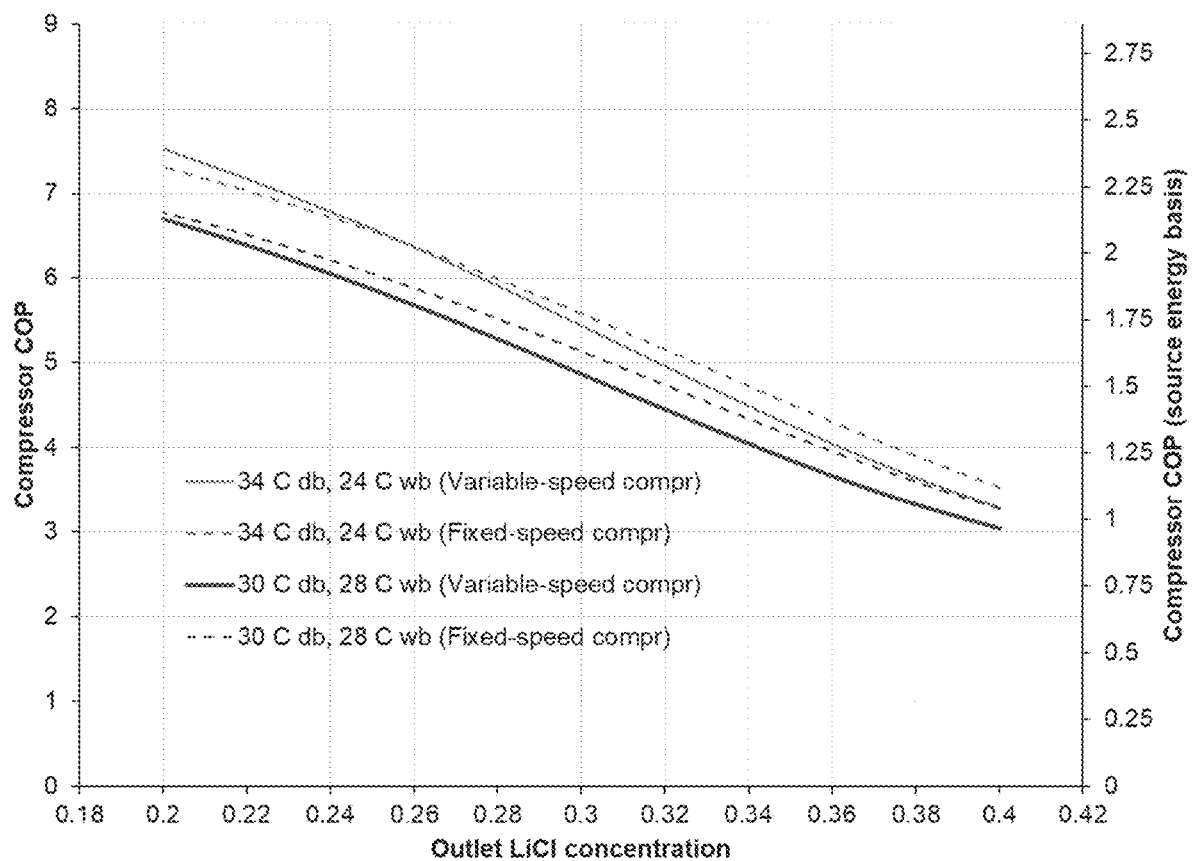
FIG. 6 depicts compressor coefficient of performance (COP) (defined as the radio of latent cooling to compressor energy input) for a range of outlet desiccant concentrations.

FIG. 6 depicts compressor coefficient of performance (COP) (defined as the ratio of latent cooling to compressor energy input) for a range of outlet desiccant concentrations. The chart shown in FIG. 6 depicts the efficiency of the compressor for a range of outlet desiccant concentrations and two different ambient air conditions, 30 and 34° C. The efficiency is shown as the coefficient of performance (COP). As depicted in FIG. 6, the efficiency increases at lower liquid desiccant concentrations, which require lower temperatures for regeneration. This means the system may be most optimally operated when the liquid desiccant is regenerated when it is most diluted. For comparison, the efficiency of a thermally-driven desiccant regenerator is about 0.8 (0.73 source) and a double-effect thermal regenerator may reach an efficiency of about 1.15 (1.05 source).

Figure 7:
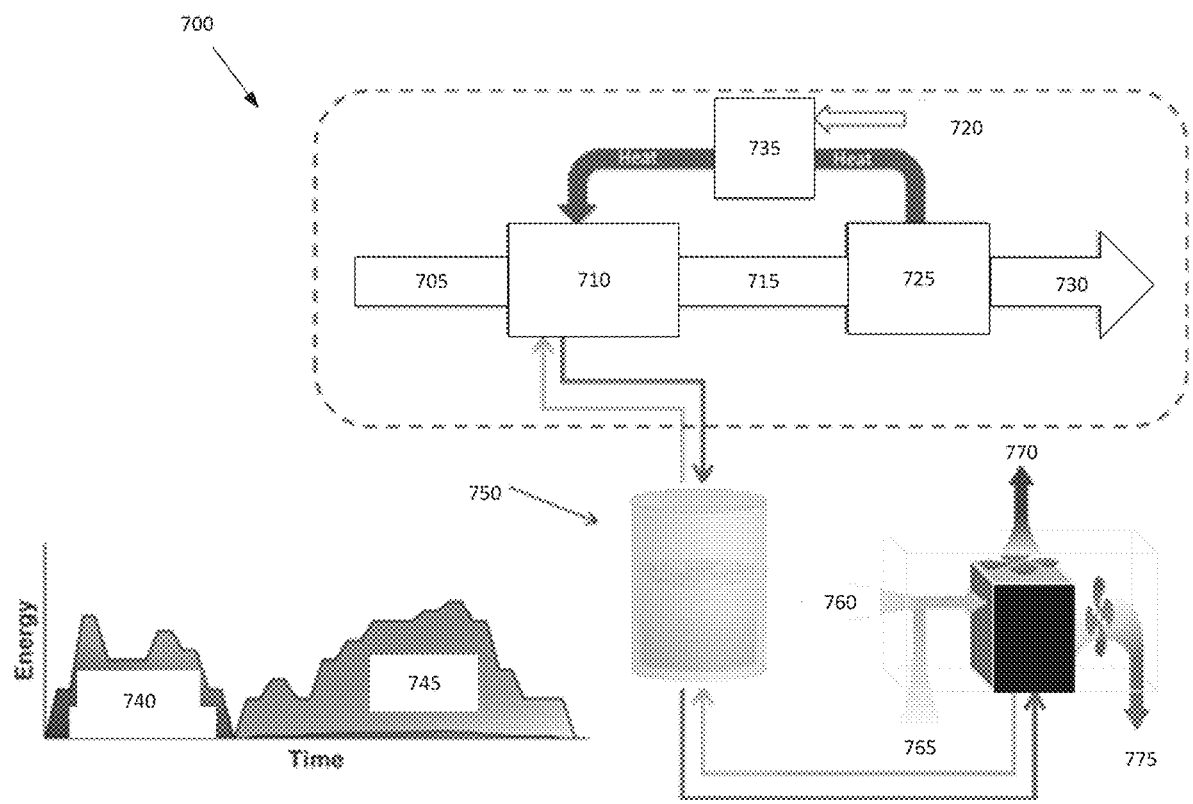
FIG. 7 illustrates a system schematic showing energy storage in a liquid desiccant tank, which enables load shifting (shown in the bottom left time plot) as described in some embodiments of the present disclosure.

FIG. 7 illustrates a system schematic showing energy storage in a liquid desiccant tank, which enables load shifting (shown in the bottom left time plot) as described in some embodiments of the present disclosure. The bottom left time plot shows how energy electricity consumption 740 follows renewable generation and the cooling provided 745 follows the cooling load. The system schematic 700 shows how ambient air 705 flows through the liquid desiccant regenerator 710 to become hot and humid air 715. The hot and humid air 715 glows through the evaporator 725 and is released as exhaust air 730. Heat from the evaporator 725 flows through the heat pump 735 to the liquid desiccant regenerator 720. Electricity 720 goes in to the heat pump 735. After leaving the liquid desiccant regenerator, strong desiccant is stored in the liquid desiccant storage tank 750. In some embodiments, the liquid desiccant may be stored in the liquid desiccant storage tank 750 for less than 24 hours, for example, for 6-12 hours. In some embodiments the liquid desiccant may be stored for over 24 hours, for example, for 36-48 hours. Storing the liquid desiccant in the liquid desiccant storage tank 750 decouples the electricity consumption of the heat pump (and the liquid desiccant regenerator) from the cooling provided. The strong desiccant flows into the liquid desiccant conditioner 755, which also serves as a cooling core. Outside air 760 and indoor air 765 also flow into the liquid desiccant conditioner 755. Some of the outdoor air is exhausted via exhaust air stream 770. The cooled indoor air 775 is returned to the room or building as cooled and dry air. The liquid desiccant conditioner 755 provides cool, dry air 775 to the building. The liquid desiccant regenerator 755 uses the liquid desiccant to absorb water vapor in the air (and thus dry the air) and uses an evaporative cooling process to cool the air. In the liquid desiccant regenerator 710 the liquid desiccant is heated, which drives off the water the liquid desiccant absorbed in the liquid desiccant conditioner 755. The energy in the air and water leaving the evaporator 725 is recovered by the heat pump 735. The heat pump 735 also provides heat to the liquid desiccant regenerator 710. The liquid desiccant storage tank 750 allows desiccant regeneration and the cooling of the room to occur at concurrently or at separate times.

Figure 8:
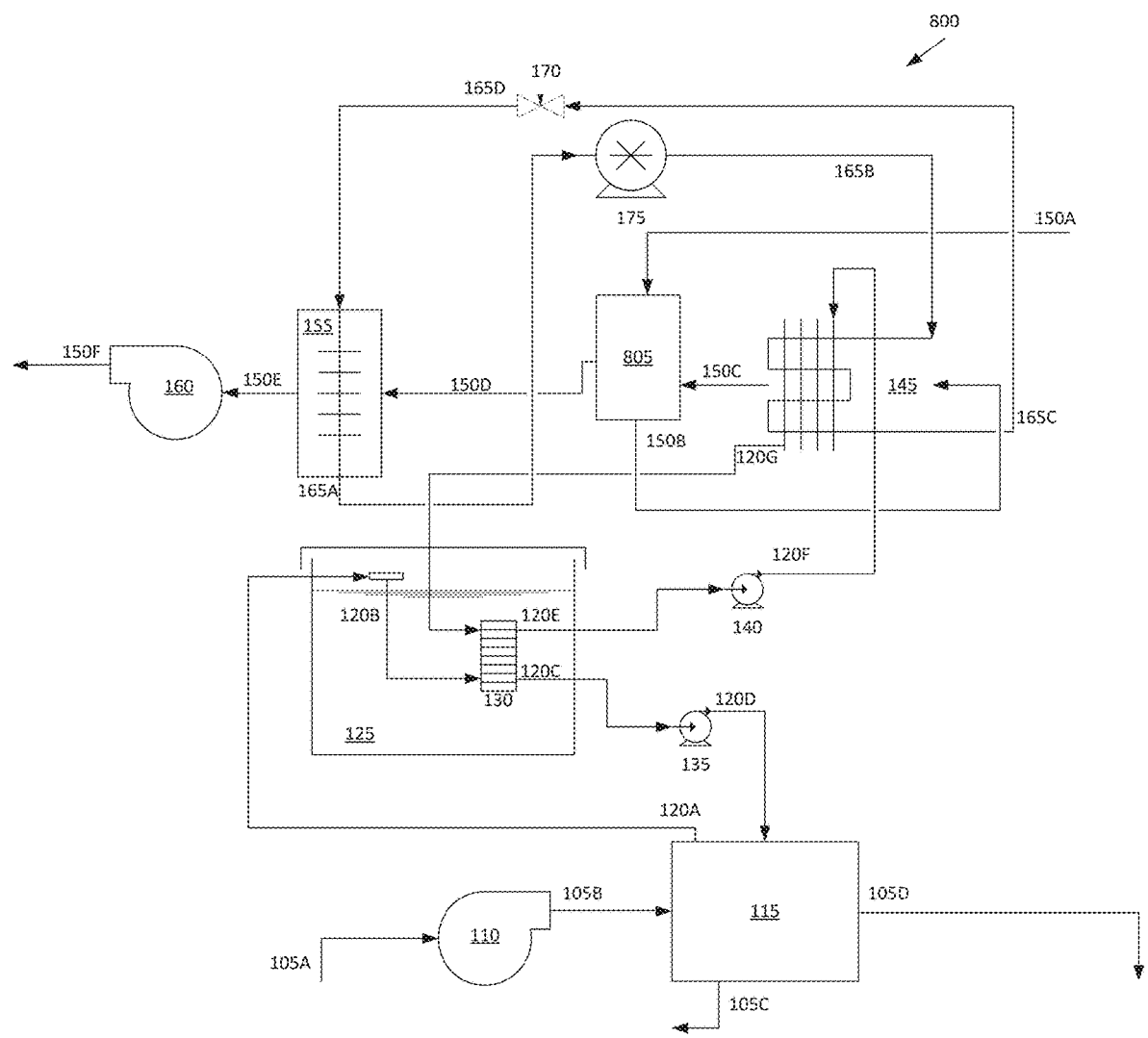
FIG. 8 illustrates a heat-pump driven liquid desiccant regeneration system and process using an air-to-air heat exchanger as a part of the heat pump as described in some embodiments of the present disclosure.

FIG. 8 illustrates a heat-pump driven liquid desiccant regeneration system and process using an air-to-air heat exchanger as a part of the heat pump as described in some embodiments of the present disclosure. For clarity, the elements in FIG. 8 that are substantially similar to that in FIG. 1, FIG. 2, FIG. 3, FIG. 4, or FIG. 5 retain their same identification numbers. As depicted in FIG. 8, in some embodiments, an air-to-air heat exchanger may be added between the air entering and exiting the liquid desiccant regenerator. This increases the efficiency by pre-heating the inlet air stream 150A without significant electrical input by the compressor. The liquid desiccant regeneration system 800 shown in FIG. 8 uses an air-to-air heat exchanger 805 around the liquid desiccant regenerator 145. Outdoor inlet air 150A flows into the air-to-air heat exchanger 805 then is circulated through the liquid desiccant regenerator 145 via air stream 150B. After absorbing heat and moisture released by the liquid desiccant in the liquid desiccant regenerator 145, the airstream 150C returns to the air-to-air heat exchanger 805, where it heats air stream 150A. After exiting the air-to-air heat exchanger 805, the cooled air stream 150D goes to the evaporator 155, where it can be used to cool the refrigerant and releases moisture to the evaporator. The moisture collected by the evaporator may be used in the evaporative cooling process of the indoor air 105A (not shown in the figure). The use of the outdoor air as a heat transfer fluid allows for heat to be maintained efficiently within the heat pump and for the heat pump to require less energy to maintain its desired temperature.

Figure 9:
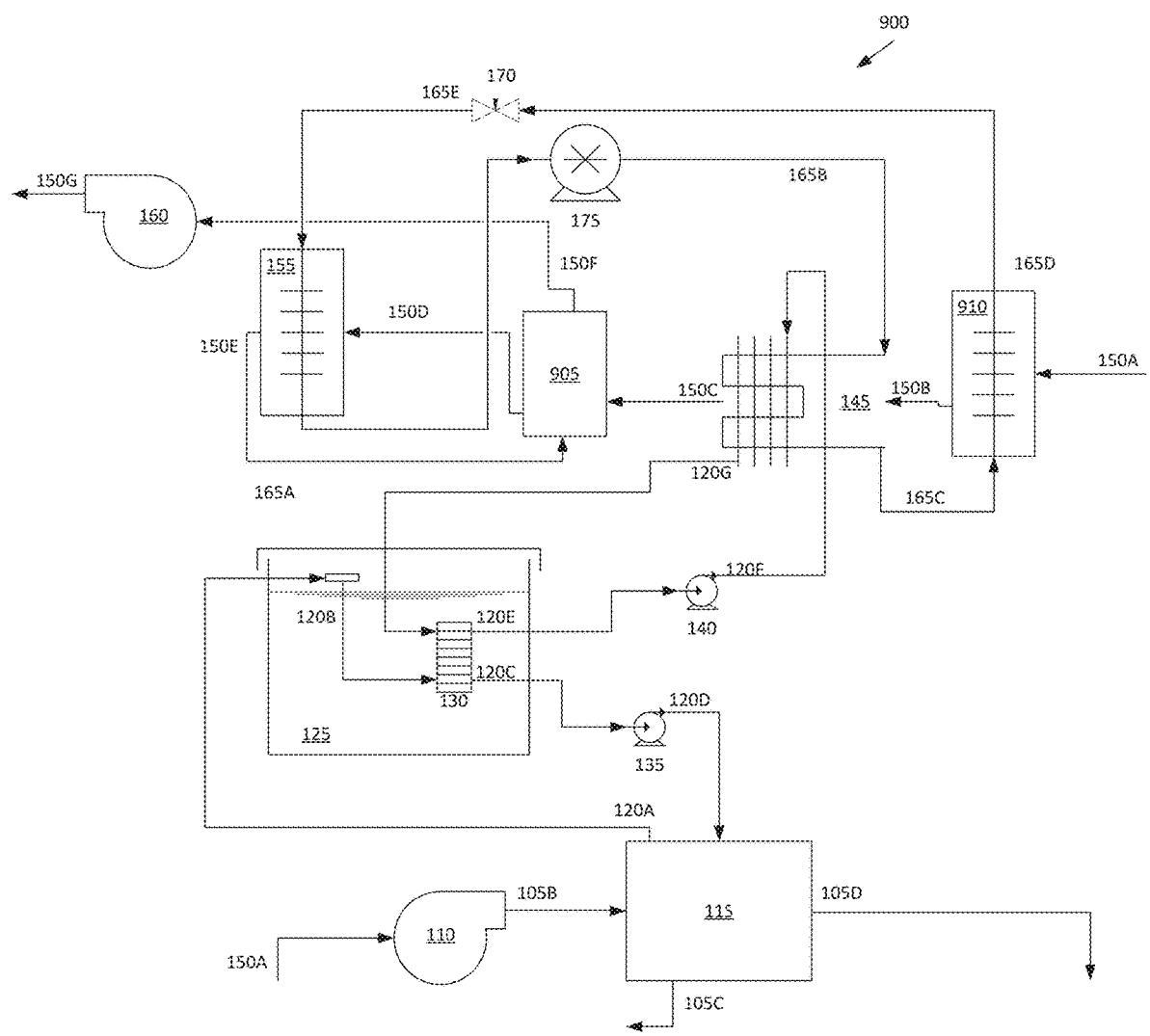
FIG. 9 illustrates a heat-pump driven liquid desiccant regeneration system and process using an air-to-air heat exchanger prior to the evaporator of the heat pump as described in some embodiments of the present disclosure.

FIG. 9 illustrates a heat-pump driven liquid desiccant regeneration system and process using an air-to-air heat exchanger prior to the evaporator of the heat pump as described in some embodiments of the present disclosure. For clarity, the elements in FIG. 9 that are substantially similar to that in FIG. 1, FIG. 2, FIG. 3, FIG. 4, FIG. 5, or FIG. 8 retain their same identification numbers. As depicted in FIG. 9, in some embodiments, an air to air heat exchanger is added between the air entering and exiting the evaporator coil. This may increase the amount of water condensing on the evaporator coil that can be recovered. The liquid desiccant regeneration system 900 includes both an air-to-air heat exchanger 905 and an air preheater/refrigerant subcooler 910. The air preheater/refrigerant subcooler 910 heats the external air stream 150A with heat from the refrigerant 165C exiting the liquid desiccant regenerator. This results in supercooled refrigerant 165D exiting the air preheater/refrigerant subcooler 905. The preheated air 150B goes into the liquid desiccant regenerator 145, where it provides heat (in addition to the heat from the refrigerant stream) to the liquid desiccant for regeneration and absorbs moisture released by the liquid desiccant. The (slightly) cooled, humid air 150C then goes to the air-to-air heat exchanger 905, where it is heated by the airstream exiting the evaporator 150E. Heated air 150D goes in to the evaporator 155, where it is cooled and releases the moisture absorbed from the liquid desiccant regeneration. The cooled air returns to the air-to-air heat exchanger 905, where any heat is transferred to the air stream entering the evaporator 150D. The cooled air is expelled to the ambient via 150F and 150G, which are propelled by an exhaust fan.

Figure 10:
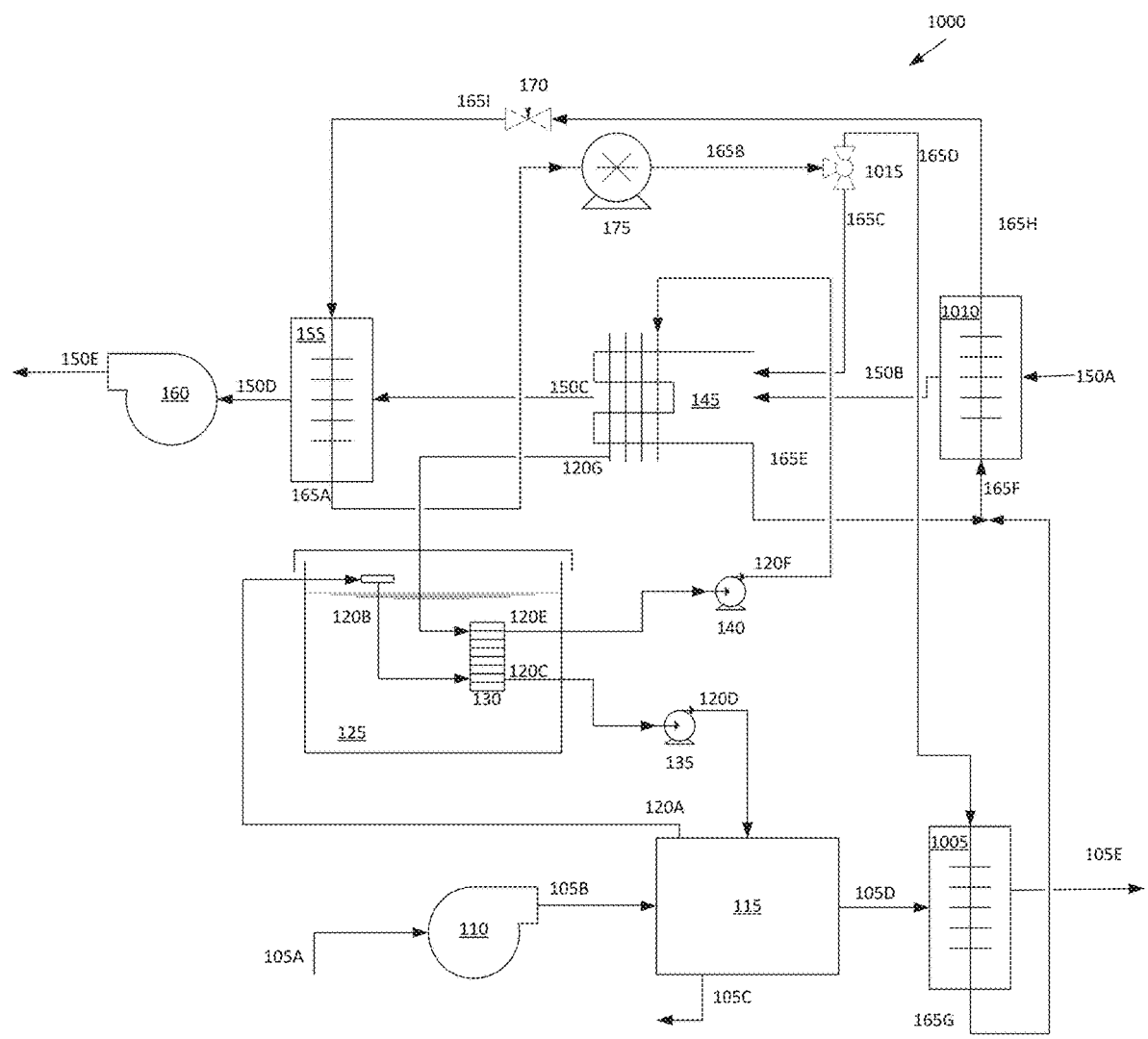
FIG. 10 illustrates a heat-pump driven liquid desiccant regeneration system and process, adding a condenser coil for heating the conditioned airstream.

FIG. 10 illustrates a heat-pump driven liquid desiccant regeneration system and process, adding a condenser coil for heating the conditioned airstream. For clarity, the elements in FIG. 10 that are substantially similar to that in FIG. 1, FIG. 2, FIG. 3, FIG. 4, FIG. 5, FIG. 8, or FIG. 9 retain their same identification numbers. As depicted in FIG. 10, in some embodiments, an air-cooled condenser on the refrigerant circuit is added to add heat to the conditioned airstream. This allows the system to act as a heat pump during periods when the adding heat to the process air stream is desirable (e.g. during winter months). The liquid desiccant regeneration system 1000 includes a condenser 1005, an air pre-heater/refrigerant subcooler 1010, and a three-way valve 1015. The system 1000 depicted in FIG. 10 may be used to heat the indoor air if heated air is desired. The condenser 1005 receives refrigerant stream 165D, which is a portion of the refrigerant stream 165B, which is hot after exiting the compressor 175. In the condenser 1005, the refrigerant stream 165D heats the cooled and dehumidified air 105D prior to release this warmed air back to the indoor space via air stream 105E. The three-way valve 1015 splits the heated refrigerant stream 165B into two streams 165C and 165D. Refrigerant stream 165D is routed through the liquid desiccant regenerator 145, where it heats the liquid desiccant stream 120F. After exiting the liquid desiccant regenerator 145, the refrigerant stream 165E is combined with the refrigerant stream leaving the compressor 165G, then sent to the air preheater/refrigerant subcooler 1010, where the refrigerant is subcooled. The heat pump in the liquid desiccant regeneration system 1000 must be operated for the condenser to provide heat to the indoor airstream. The condenser may operate without the use of the desiccant, if the three-way valve 1015 directs refrigerant only to the condenser 1005 and not to the liquid desiccant regenerator 145. However, the liquid desiccant regeneration system 1000 may also be used to cool the indoor air stream without the use of the heat pump. In that operation the air stream 105D would pass through the condenser 1005 without being heated (as the refrigerant would only be flowing when the heat pump is in operation). The three-way valve 1015 may also prevent the flow of refrigerant 165D to the condenser 1005 if the indoor air stream 105D is desired to be cooled.

Figure 11:
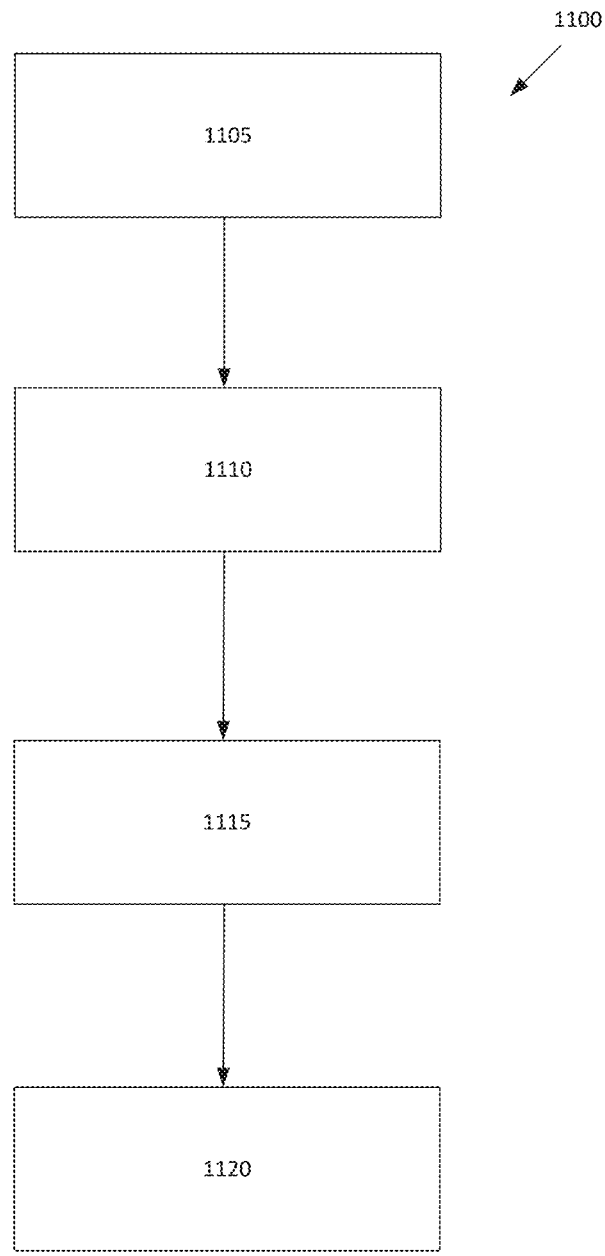
FIG. 11 is a flow chart for a heat-pump driven liquid desiccant regeneration process according to some embodiments of the present disclosure.

FIG. 11 is a flow chart for a heat-pump driven liquid desiccant regeneration process according to some embodiments of the present disclosure. The liquid desiccant regeneration process 1100 may utilize any of the embodiments described in FIG. 1-3, 5, or 8-10. Step 1105 includes using a combination of liquid desiccant dehumidification and evaporative cooling to dehumidify and cool a process air stream. The air stream may first be dehumidified by a strong liquid desiccant (thereby making the liquid desiccant weak) then cooled using an evaporative cooling process. Step 1110 then includes storing the weak liquid desiccant and strong liquid desiccant in a storage tank. The strong liquid desiccant may be removed from the tank as needed to dehumidify the process air stream in step 1105. As the ratio between the weak liquid desiccant and strong liquid desiccant contained in the storage tank increases, the next step 1115 may be initiated. Step 1115 includes regenerating the liquid desiccant by utilizing the hot side of a heat pump. This may be done by "turning on" the heat pump (i.e., supplying it with electricity so it operates). The portion of a heat pump which is the condenser may be used as a liquid desiccant regenerator, where the weak liquid desiccant is heated by the refrigerant stream. The heat pump may be operated when electricity costs are cheap, or when the load on the electrical grid is low. The heat pump may also be operated when all of the liquid desiccant is weak and unable to remove moisture from the process air stream. The process air stream may be dehumidified and cooled concurrently with the operation of 1115 (that is, steps 1105 and 1115 may be operated concurrently). Step 1120 includes ceasing operation of the heat pump and returning to cooling the process air without the use of the heat pump.

Figure 12:
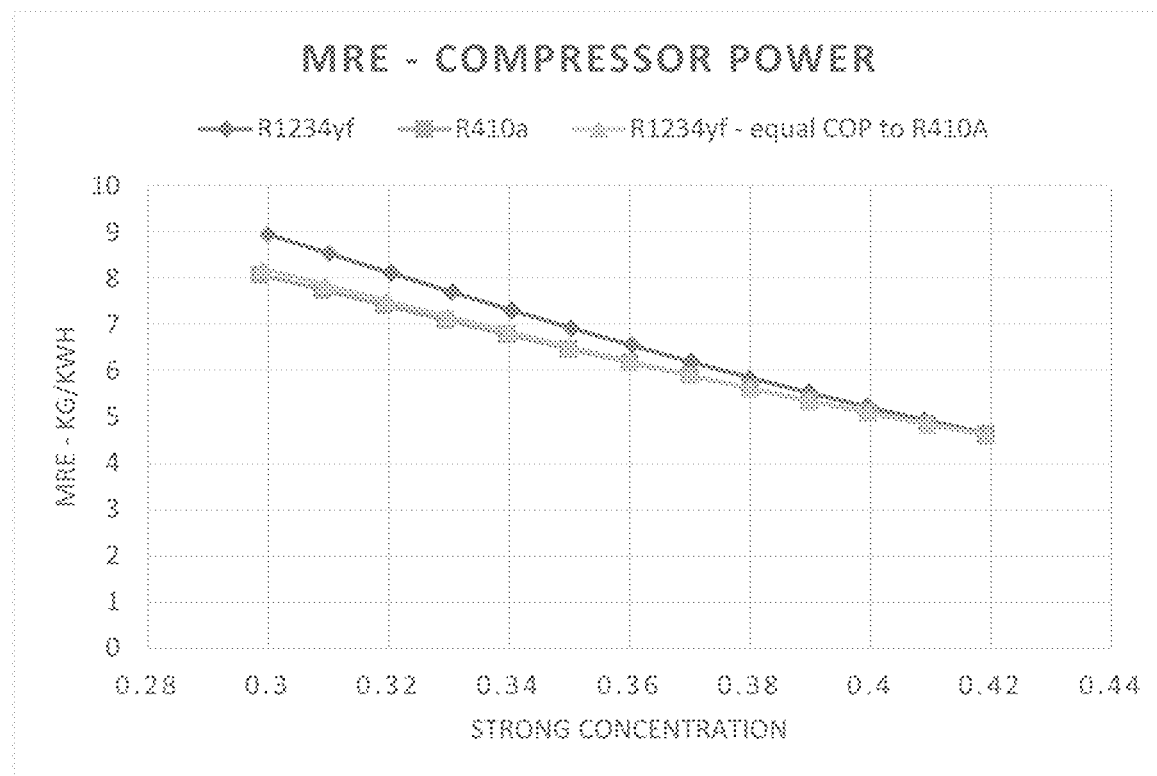
FIG. 12 shows a comparison of moisture removal efficiency (MRE) for two different types of refrigerant.

FIG. 12 shows a comparison of moisture removal efficiency (MRE) for two different types of refrigerant. Refrigerants R410A and R1234yf were compared and using refrigerant R1234yf in the system as described in FIG. 5 resulted in a greater MRE. The MRL is the amount of water removed (in kg) from the liquid desiccant in the regenerator divided by the energy input in to the compressor (in kwh). The third line shows the MRE of R1234yf when the coefficient of performance (COP) is made to be equal to the COP of 410A. This was done by operating the compressor at a greater level when using R1234yf. All of the refrigerants in FIG. 12 were run through the system as shown in FIG. 5.

Figure 13:
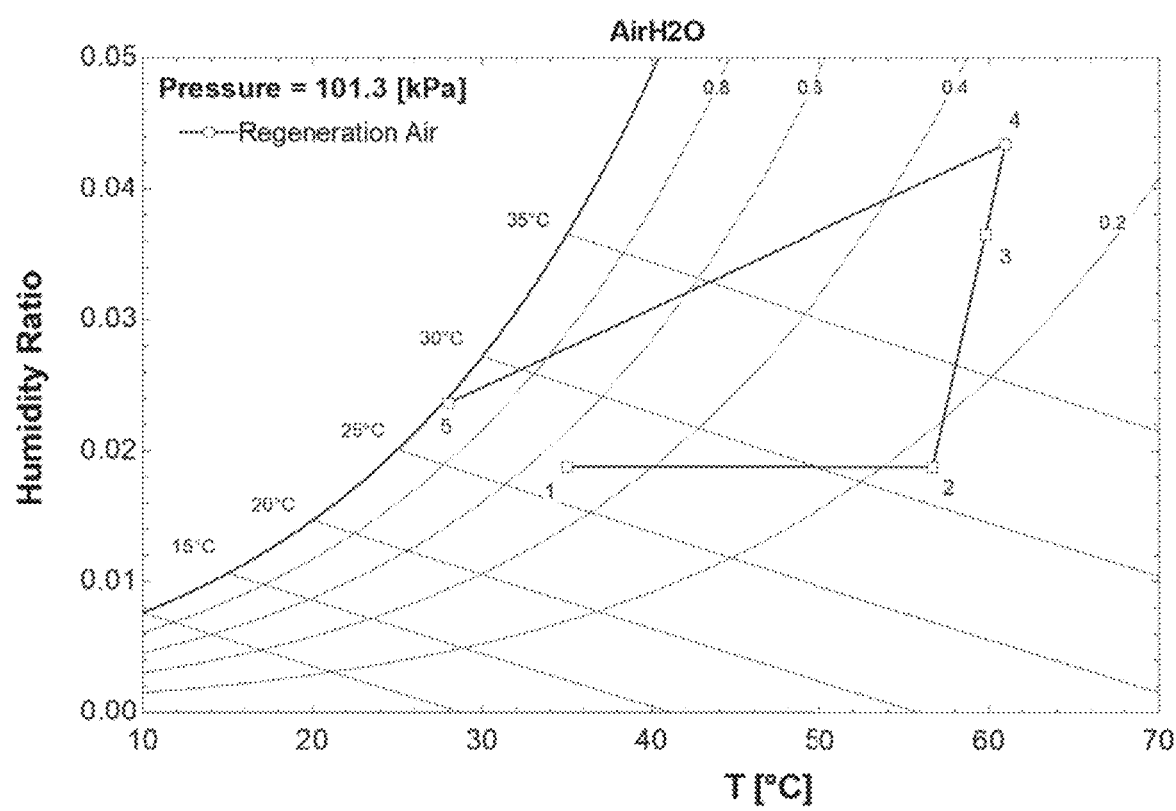
FIG. 13 shows the change in the process air temperature and humidity ratio using refrigerant R410A.

FIG. 13 shows the change in the process air temperature and humidity ratio using refrigerant R410A. This graph shows the temperature and humidity ratio of the outdoor air stream 150 as operated in the system in FIG. 5. 1 to 2 shows the increase in temperature as outdoor air 150A goes through the air preheater/refrigerant subcooler 505. The change from 2 to 3 to 4 shows the outdoor air stream 150B going through the liquid desiccant regenerator 145. In the regenerator the outdoor air stream 150B acts as a sweep gas or scavenging air and absorbs heat and moisture in the regenerator. 4 to 5 shows the large release of heat and moisture by the outdoor air stream 150A that occurs in the evaporator 155. FIG. 13 demonstrates how the outdoor air stream 150 may be used to make the process 500 more efficient and reduce lost energy and moisture.

Figure 14:
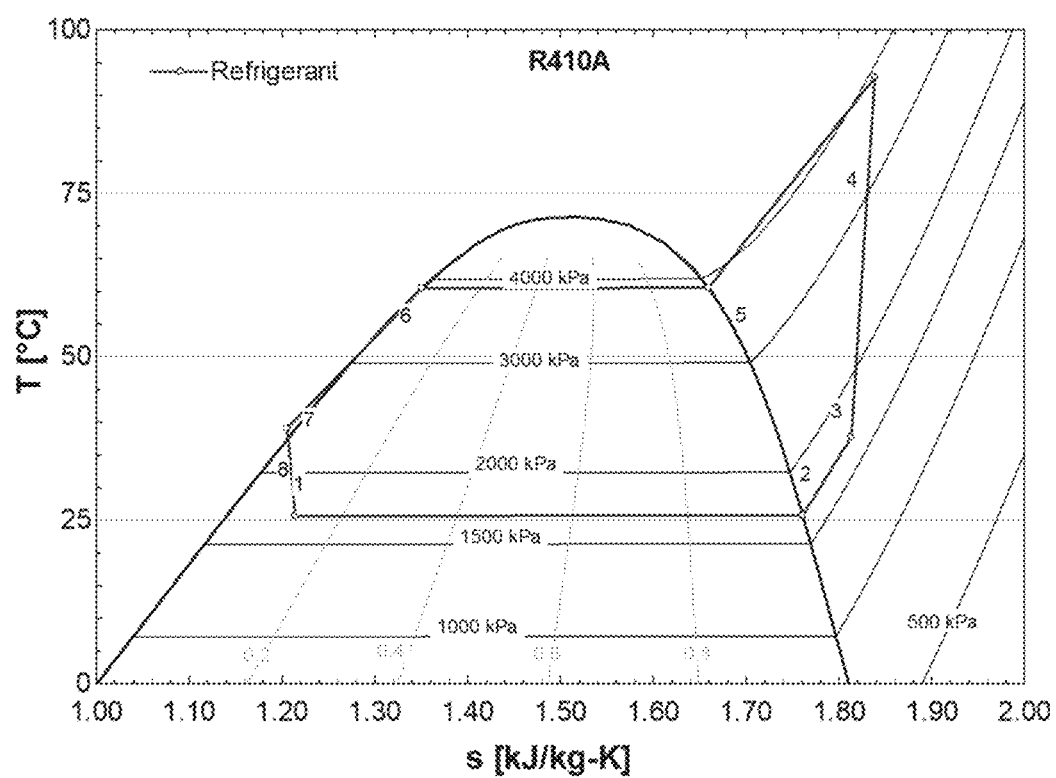
FIG. 14 depicts the refrigerant states throughout the process as shown in FIG. 5 using refrigerant R410A.

FIG. 14 depicts the refrigerant states throughout the process as shown in FIG. 5 using refrigerant R410A. Reviewing FIG. 14 compared to FIG. 18, which shows the same information for refrigerant R1234yf shows why refrigerant R410A may be the preferred refrigerant in some embodiments. This is because of the ability of R410A to be superheated. 1 to 2 shows the increase in entropy as the refrigerant stream 165E going through the evaporator 155. 2, 3, and 4 show the increase in temperature as the refrigerant stream 165F goes through the compressor 175. 4, 5, and 6 show the decrease in temperature as the refrigerant stream 165B goes through the regenerator 145. 6 to 7 and 8 shows the decrease in temperature as the refrigerant 165C is subcooled in the air preheater/refrigerant subcooler 505.

Figure 15:
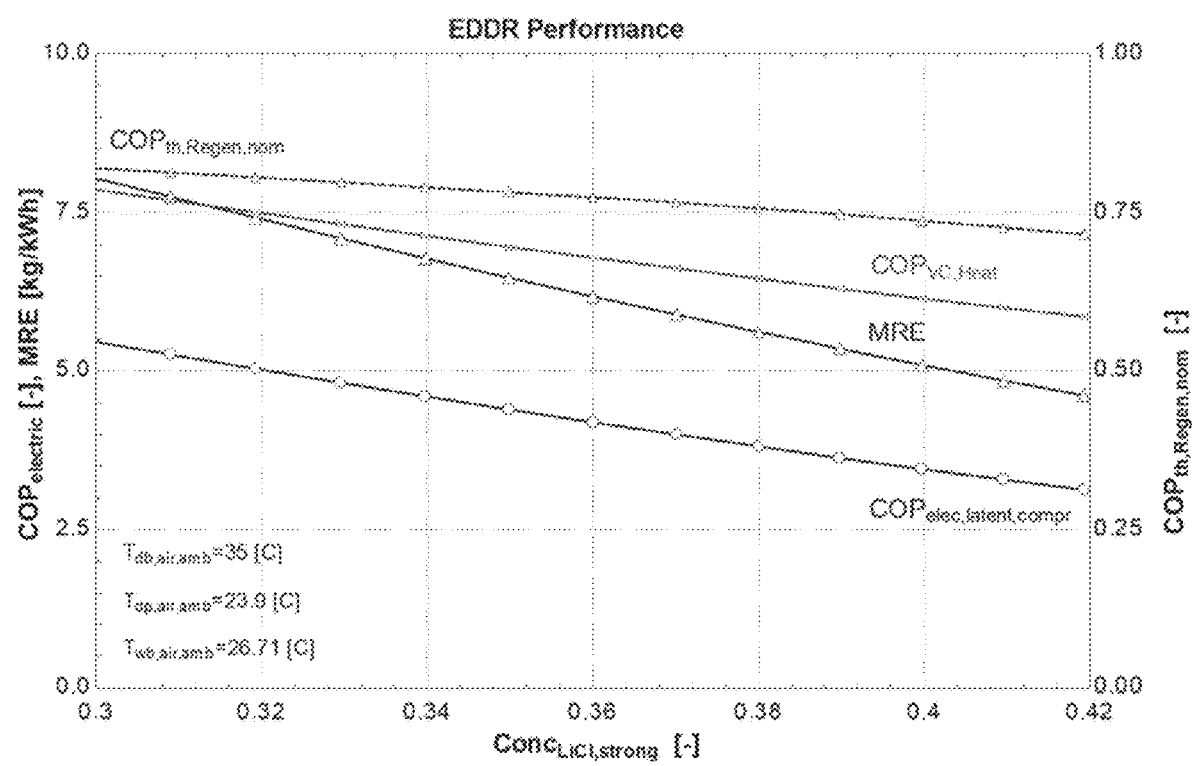
FIG. 15 shows the coefficient of performance (COP) and MRE throughout the process as shown in FIG. 5, using refrigerant R410A and lithium chloride as the liquid desiccant.

FIG. 15 shows the coefficient of performance (COP) and MRE throughout the process as shown in FIG. 5, using refrigerant R410A and lithium chloride as the liquid desiccant. EDDR stands for electrically driven desiccant regeneration. Like FIG. 6, FIG. 15 indicates that the system operates more efficiently when the liquid desiccant is very diluted.

Figure 16:
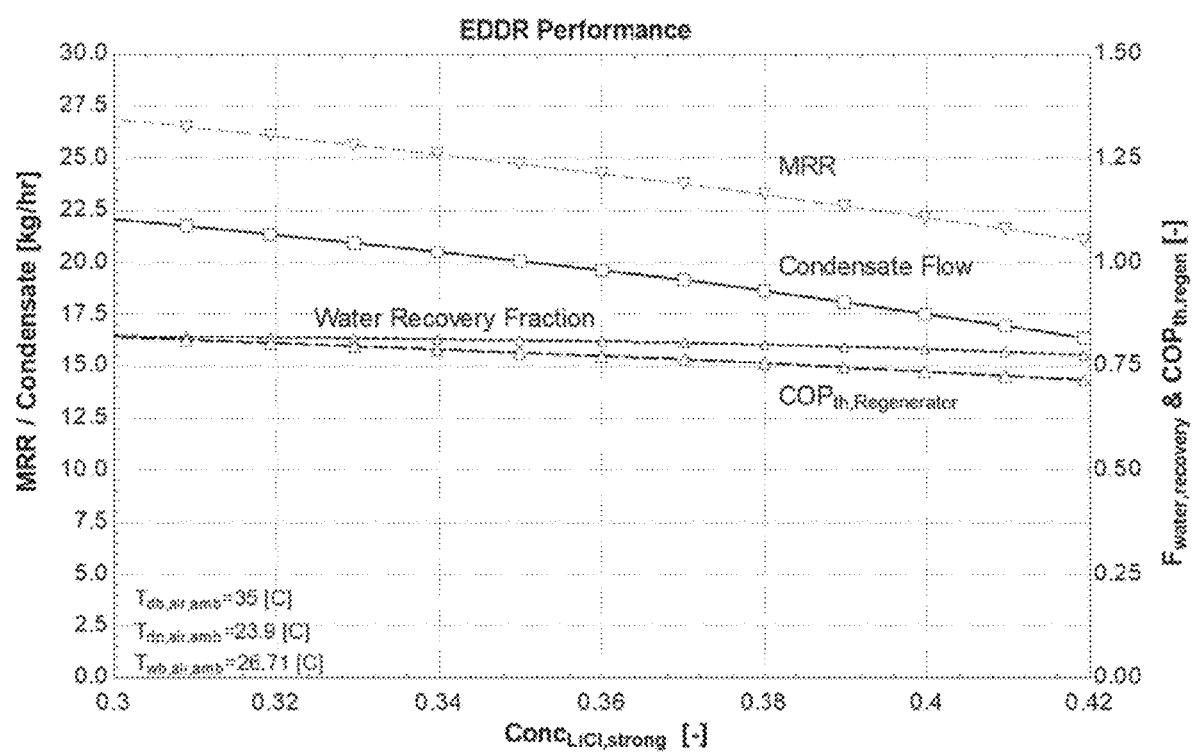
FIG. 16 shows the moisture removal rate (MRR), water recovery fraction, and COP of the system as shown in FIG. 5 using refrigerant R410A and lithium chloride as the liquid desiccant.

FIG. 16 shows the moisture removal rate (MRR), water recovery fraction, and COP of the system as shown in FIG. 5 using refrigerant R410A and lithium chloride as the liquid desiccant. FIG. 16 indicates that the moisture removal rate (MRR) and condensate flow both decrease as the desiccant becomes more concentrated. This, like FIG. 6 and FIG. 15, indicate that the heat pump may be operated most efficiently by operating when the liquid desiccant is most diluted. That is, waiting to operate the heat pump and regenerate the liquid desiccant when it is most diluted results in the most energy efficient and optimal usage of the heat pump and the liquid desiccant regeneration system.

Figure 17:
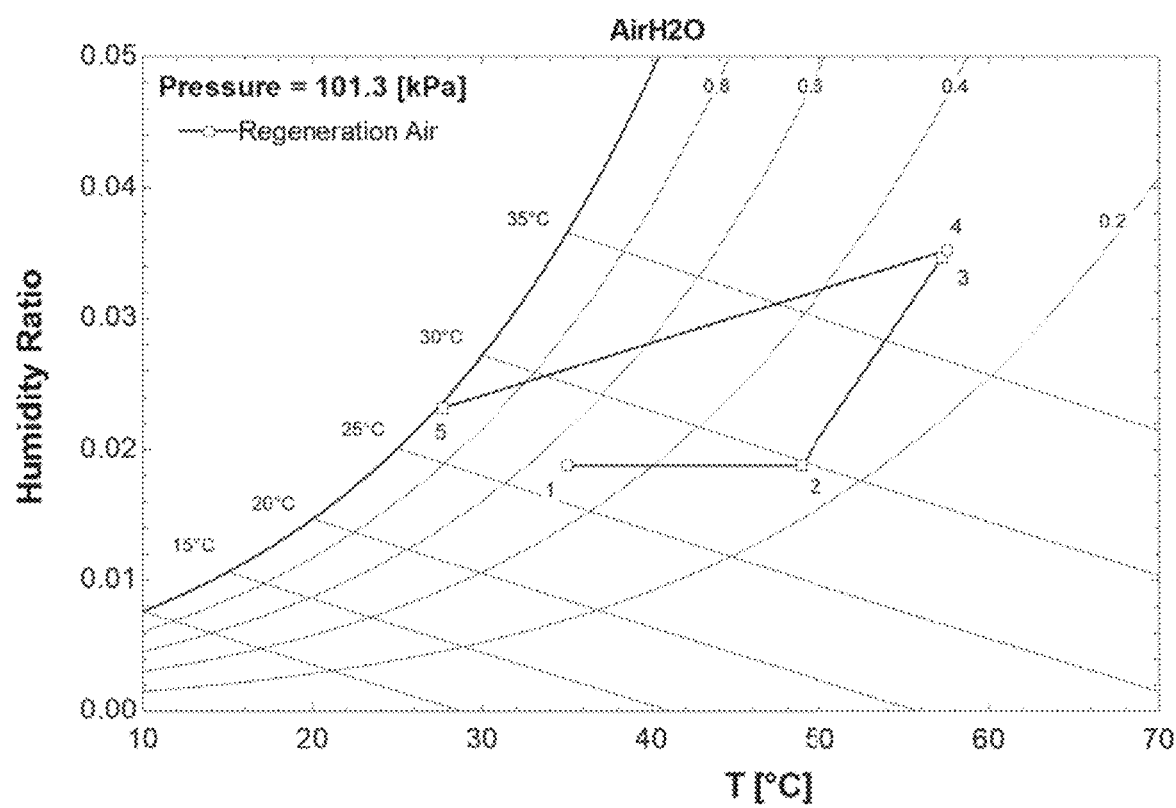
FIG. 17 shows the change in the process air temperature and humidity ratio using refrigerant R1234yf.

FIG. 17 shows the change in the process air temperature and humidity ratio using refrigerant R1234yf. The process air stream 150 was routed through the system 500 as shown in FIG. 5. 1 to 2 shows the increase in temperature as outdoor air stream 150A goes through the air preheater/refrigerant subcooler 505. 2 to 3 shows the increase in temperature and humidity as the outdoor air 150B goes through the regenerator 145. The outdoor air 150B acts as a scavenging air or sweep gas and absorbs heat and moisture from the regenerator 145 and deposits them in the evaporator 155. 4 to 5 is that loss of heat and moisture by the outdoor air stream 150C as it goes through the evaporator. This "recycling" of the heat and moisture from the regenerator to the evaporator helps the heat pump to operate more efficiently and to reduce heat loss.

Figure 18:
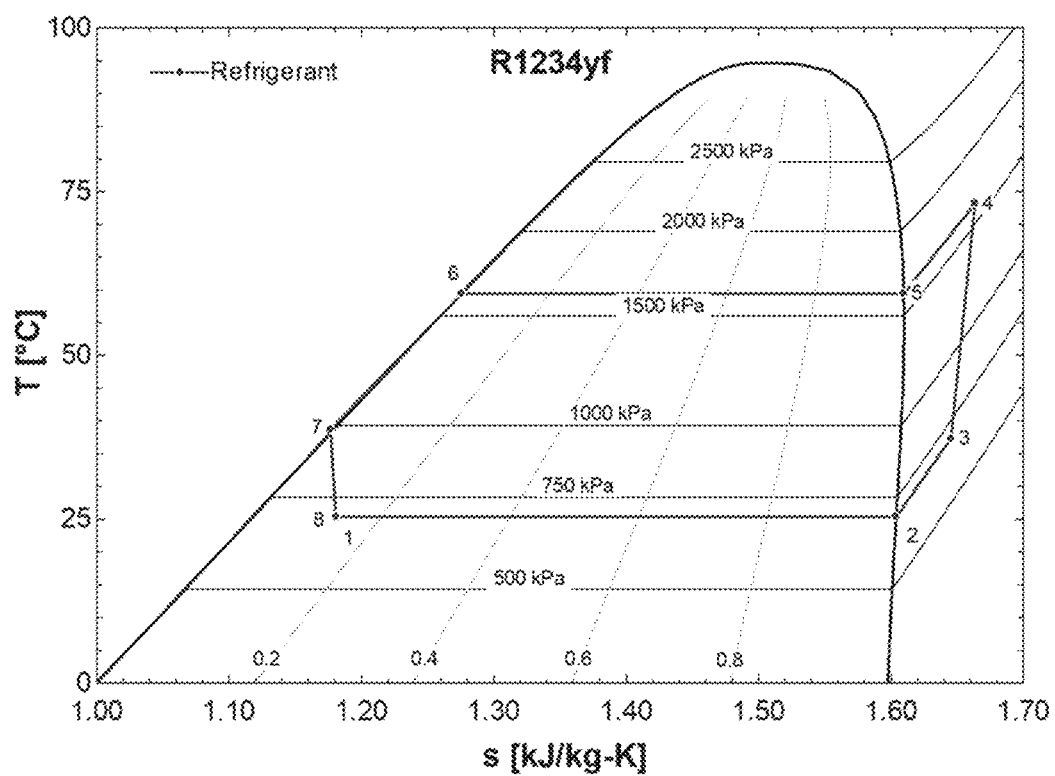
FIG. 18 depicts the refrigerant states through the process as shown in FIG. 5 using refrigerant R1234yf.

FIG. 18 depicts the refrigerant states through the process as shown in FIG. 5 using refrigerant R1234yf. 1 to 2 shows the refrigerant 165E as it isothermally increases entropy in the evaporator. 2, 3, and 4 show the increase in temperature as refrigerant stream 165A is routed through the compressor. Notice that the peak temperature reached by the R1234yf refrigerant stream in FIG. 18 is less than the peak temperature reached by the R410A stream in FIG. 14. This lower peak temperature level means that refrigerant R1234yf is not as good at heating the liquid desiccant n the regenerator 145 and therefore may not be as good of a refrigerant as R410A in this process 500. 4, 5, and 6 are the decrease in temperature and entropy as the refrigerant stream 1654B goes through the regenerator 145. The smaller loss of entropy shown by refrigerant R1234yf compared to R410A means than R410A is able to transfer a larger amount of heat to the liquid desiccant in the regenerator 145. 6, 7, and 8 are the refrigerant stream 165C as it goes in to the air preheater/refrigerant subcooler 505.

Figure 19:
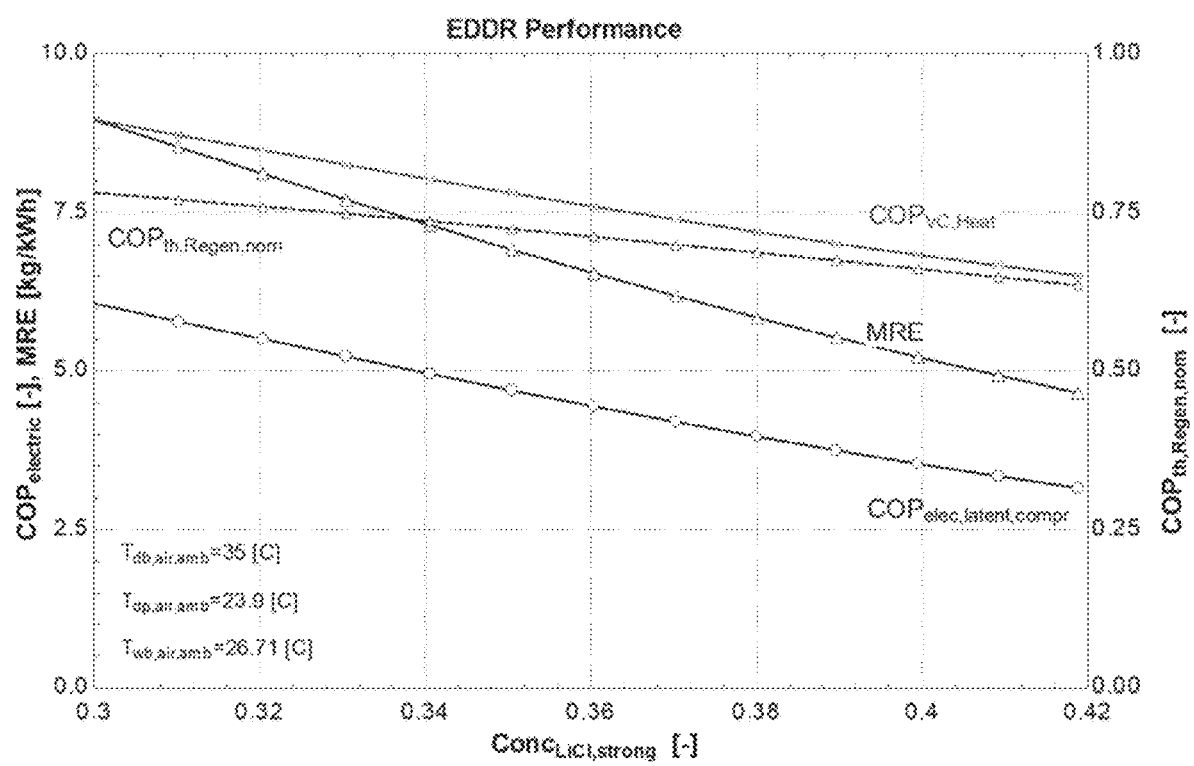
FIG. 19 shows the COP and MRE throughout the process as shown in FIG. 5, using refrigerant R1234yf and lithium chloride as the liquid desiccant.

FIG. 19 shows the COP and MRE throughout the process as shown in FIG. 5, using refrigerant R1234yf and lithium chloride as the liquid desiccant. Compared to FIG. 15, which shows the same information but a system 500 operating using the refrigerant R410A, the heat pump operates more efficiently when using R1234yf compared to R410A. The trend of being more efficient when the liquid desiccant is most diluted (i.e., is the weakest) is shown here as well.

Figure 20:
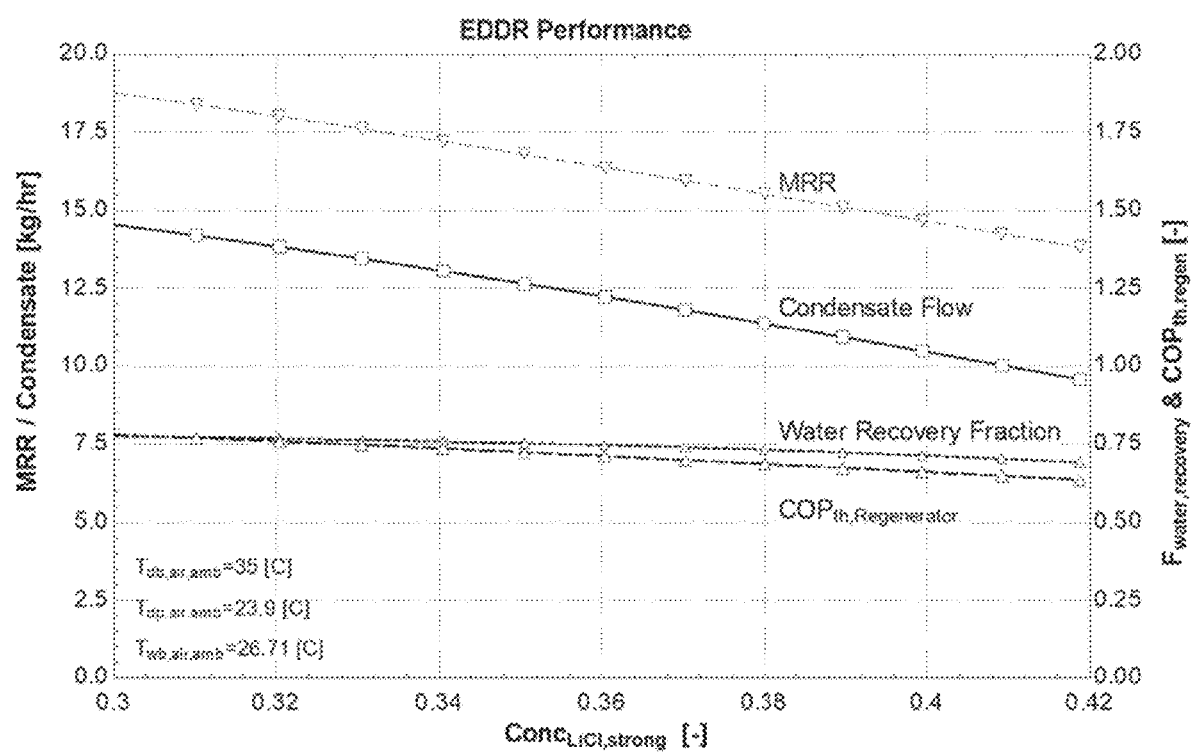
FIG. 20 shows the MRR, water recovery fraction, and COP of the system as shown in FIG. 5 using refrigerant R1234yf and lithium chloride as the liquid desiccant.

FIG. 20 shows the MRR, water recovery fraction, and COP of the system as shown in FIG. 5 using refrigerant R1234yf and lithium chloride as the liquid desiccant. Compared to FIG. 16, which shows the same information but for a system 500 operated using the refrigerant 410A, the MRR is slightly lower. That is, while the energy efficiency using R1234yf is greater, the amount of water removed may not be.

While various aspects and embodiments have been discussed above, those of skill in the art will recognize certain modifications, permutations, additions, and sub combinations thereof. It is therefore intended that the following appended claims and claims hereafter introduced are interpreted to include all such modifications, permutations, additions, and sub-combinations as are within their true spirit and scope.

The invention claimed is:

1. A method comprising:
removing a moisture from a first air stream using a desiccant to absorb the moisture;
operating a heat pump comprising a refrigerant stream circulating through an evaporator, a compressor, a valve, and a condenser;
routing the desiccant that is diluted with the moisture through the condenser to heat the desiccant and evaporate the moisture;
collecting the evaporated moisture using a second air stream also routed through the condenser; and
depositing the evaporated moisture in the evaporator by routing the second air stream through the evaporator.

2. The method of claim 1, further comprising cooling the first air stream using evaporative cooling.

3. The method of claim 2, wherein the evaporated moisture collected in the evaporator is used to provide the evaporative cooling.

4. The method of claim 1, wherein:
the second air stream is routed through an air-to-refrigerant heat exchanger prior to entering the condenser, and
the refrigerant is routed through the air-to-refrigerant heat exchanger after exiting the condenser.

5. The method of claim 1, wherein the second air stream is routed through an air-to-air heat exchanger after exiting the condenser but prior to entering the evaporator.

6. The method of claim 5, wherein the second air stream is routed through the air-to-air heat exchanger prior to entering the condenser.

7. The method of claim 5, wherein the second air stream is routed through the air-to-air heat exchanger after exiting the evaporator.

8. The method of claim 1, further comprising:
splitting the refrigerant stream exiting the compressor into a first refrigerant stream and a second refrigerant stream using a three-way valve;
routing the first refrigerant stream through the condenser;
routing the second refrigerant stream and the first air stream through a first air-to-refrigerant heat exchanger;
combining the first refrigerant stream and the second refrigerant stream into a unified refrigerant stream;
routing the unified refrigerant stream through a second air-to-refrigerant heat exchanger; and
routing the second air stream through the second air-to-refrigerant heat exchanger prior to entering the condenser.

9. The method of claim 8, wherein the first air stream is heated by the first air-to-refrigerant heat exchanger.

10. The method of claim 1, wherein:
the refrigerant stream bypasses the condenser,
the refrigerant stream is used to heat a secondary fluid in a refrigerant-to-secondary fluid heat exchanger, and
the secondary fluid is routed through the condenser.

11. The method of claim 10, wherein the secondary fluid is water.

12. The method of claim 10, wherein:
the refrigerant is routed through an air-to-refrigerant heat exchanger after exiting the refrigerant-to-secondary fluid heat exchanger, and
the second air stream passes through the air-to-refrigerant heat exchanger prior to entering the condenser.

13. The method of claim 1, wherein the operation of the heat pump occurs when a majority of the desiccant is diluted with the moisture.

14. The method of claim 1, further comprising storing the desiccant and the moisture in a tank.

15. The method of claim 14, wherein the tank contains a device configured to measure the volume of the desiccant and the moisture in the tank.

16. The method of claim 15, wherein the heat pump is operated when the volume of the desiccant and the moisture in the tank reaches a pre-determined level.

17. The method of claim 1, wherein the heat pump is operated until a majority of the desiccant is not diluted with the moisture.

\* \* \* \* \*